United States Patent
Kato

(10) Patent No.: US 10,860,028 B2
(45) Date of Patent: *Dec. 8, 2020

(54) VEHICLE CONTROL APPARATUS, VEHICLE CONTROL METHOD, AND PROGRAM

(71) Applicant: HONDA MOTOR CO., LTD., Tokyo (JP)

(72) Inventor: Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 242 days.

This patent is subject to a terminal disclaimer.

(21) Appl. No.: 16/101,690

(22) Filed: Aug. 13, 2018

(65) Prior Publication Data

US 2019/0049974 A1 Feb. 14, 2019

(30) Foreign Application Priority Data

Aug. 14, 2017 (JP) ................................. 2017-156506

(51) Int. Cl.
*G05D 1/02* (2020.01)
*G01C 21/34* (2006.01)
(Continued)

(52) U.S. Cl.
CPC .......... *G05D 1/0214* (2013.01); *G01C 21/20* (2013.01); *G01C 21/3407* (2013.01);
(Continued)

(58) Field of Classification Search
CPC ......... G05D 1/0214; G05D 2201/0213; G05D 1/0061; G05D 1/0212; G08G 1/166;
(Continued)

(56) References Cited

U.S. PATENT DOCUMENTS 8,082,074 B2 * 12/2011 Duggan ............... G05D 1/0088
701/24
8,103,398 B2 * 1/2012 Duggan ............... G05D 1/0061
701/24
(Continued)

FOREIGN PATENT DOCUMENTS

CN    101641610 A  *  2/2010  ............... B60Q 1/04
CN    102592495 B  *  7/2014  ............. G01C 21/32
(Continued)

*Primary Examiner* — Behrang Badii
*Assistant Examiner* — Jalal C Coduroglu
(74) *Attorney, Agent, or Firm* — Westerman, Hattori, Daniels & Adrian, LLP

(57) ABSTRACT

A vehicle control apparatus includes a detecting unit that detects an surrounding object around a vehicle; a first setting unit that sets a first potential for multiple divided areas resulting from division of a road area based on the road area; a second setting unit that sets a second potential for the divided areas based on the detected surrounding object; an evaluating unit that calculates an index value by evaluating a potential of a target divided area based on the first potential and the second potential set for the target divided area in the multiple divided areas and foreseen information generated for surrounding divided areas selected from a periphery of the target divided area; and a selecting unit that selects one or more divided areas along a moving direction of the vehicle from the multiple divided areas based on the calculated index value.

10 Claims, 22 Drawing Sheets

(51) Int. Cl.
    *G01C 21/20*         (2006.01)
    *G08G 1/16*          (2006.01)
    *G01C 21/36*         (2006.01)

(52) U.S. Cl.
    CPC ......... *G01C 21/3461* (2013.01); *G08G 1/165* (2013.01); *G08G 1/166* (2013.01); *G08G 1/167* (2013.01); *G01C 21/3658* (2013.01); *G05D 2201/0213* (2013.01)

(58) Field of Classification Search
    CPC .... G08G 1/167; G08G 1/165; G01C 21/3407; G01C 21/3461; G01C 21/20; G01C 21/3658; B60W 30/08; B60W 30/14
    See application file for complete search history.

(56) References Cited

U.S. PATENT DOCUMENTS

| | | | | |
|---|---|---|---|---|
| 8,244,408 | B2* | 8/2012 | Lee | B60W 30/0953 |
| | | | | 700/301 |
| 8,260,515 | B2* | 9/2012 | Huang | B60W 40/09 |
| | | | | 701/70 |
| 9,147,296 | B2* | 9/2015 | Ricci | G06F 16/183 |
| 9,522,676 | B2* | 12/2016 | Nespolo | B60W 30/095 |
| 9,701,307 | B1* | 7/2017 | Newman | B60W 10/184 |
| 9,751,531 | B2* | 9/2017 | Kato | B60W 30/16 |
| 10,275,797 | B2* | 4/2019 | Freytag | B60W 40/105 |
| 2008/0243378 | A1* | 10/2008 | Zavoli | G01C 21/28 |
| | | | | 701/533 |
| 2009/0052742 | A1* | 2/2009 | Okamoto | G06K 9/00798 |
| | | | | 382/104 |
| 2012/0109446 | A1* | 5/2012 | Yousefi | H04L 47/6275 |
| | | | | 701/29.3 |
| 2012/0243048 | A1* | 9/2012 | Asai | G06F 3/1292 |
| | | | | 358/1.16 |
| 2015/0153735 | A1* | 6/2015 | Clarke | B60W 10/20 |
| | | | | 701/301 |
| 2015/0375744 | A1* | 12/2015 | Kato | B60W 30/16 |
| | | | | 701/96 |
| 2016/0159381 | A1* | 6/2016 | Fahmy | B61L 27/0088 |
| | | | | 701/19 |
| 2017/0341653 | A1* | 11/2017 | Kubota | B60W 30/18154 |
| 2018/0220948 | A1* | 8/2018 | Kojima | A61B 5/0077 |
| 2018/0356820 | A1* | 12/2018 | Mori | G08G 1/166 |
| 2019/0202473 | A1* | 7/2019 | Kaji | B60W 50/0097 |
| 2019/0236380 | A1* | 8/2019 | Fukuhara | G05D 1/0251 |
| 2019/0276028 | A1* | 9/2019 | Toda | B60W 30/18163 |
| 2019/0278285 | A1* | 9/2019 | Umeda | G05D 1/0223 |
| 2019/0286135 | A1* | 9/2019 | Yasuda | B62D 15/0285 |
| 2020/0064483 | A1* | 2/2020 | Li | G01S 13/931 |
| 2020/0070844 | A1* | 3/2020 | Goto | G06Q 30/02 |
| 2020/0074302 | A1* | 3/2020 | Goto | G06N 3/08 |
| 2020/0077278 | A1* | 3/2020 | Jornod | H04W 16/22 |
| 2020/0079379 | A1* | 3/2020 | Mimura | B60W 30/18163 |
| 2020/0156662 | A1* | 5/2020 | Mimura | B60K 35/00 |
| 2020/0172123 | A1* | 6/2020 | Kubota | B60W 50/14 |

FOREIGN PATENT DOCUMENTS

| | | | | |
|---|---|---|---|---|
| CN | 103155015 B | * | 12/2014 | ............ G06T 7/246 |
| CN | 104205190 A | * | 12/2014 | .......... G09B 29/106 |
| CN | 105584481 A | * | 5/2016 | .......... B60W 30/143 |
| CN | 108700879 A | * | 10/2018 | ............ G06K 9/6282 |
| JP | 2005173806 A | * | 6/2005 | ............ G01S 13/931 |
| JP | 2011227826 A | * | 11/2011 | .......... G09B 29/007 |
| JP | 4949063 B2 | | 6/2012 | |
| WO | WO-2016158197 A1 | * | 10/2016 | ............ G01C 21/26 |
| WO | WO-2017038289 A1 | * | 3/2017 | ............ B60W 30/09 |
| WO | WO-2017057528 A1 | * | 4/2017 | ............ G08G 1/16 |
| WO | WO-2017073248 A1 | * | 5/2017 | ............ F21S 41/00 |
| WO | WO-2017073249 A1 | * | 5/2017 | ............ G02B 27/01 |
| WO | WO-2017073250 A1 | * | 5/2017 | ............ B60Q 1/04 |

\* cited by examiner

FIG. 22
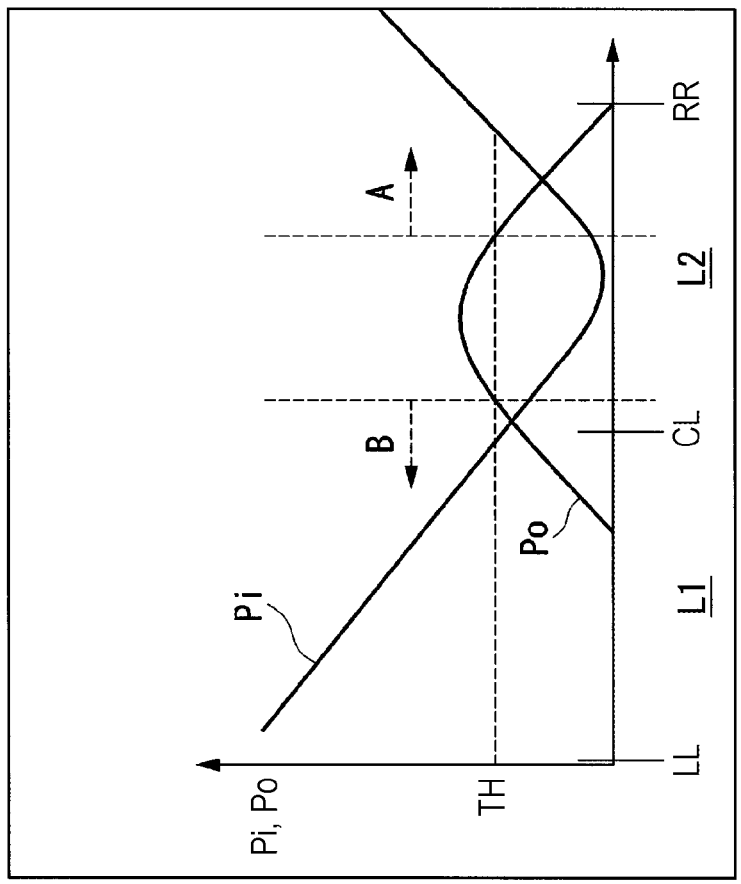
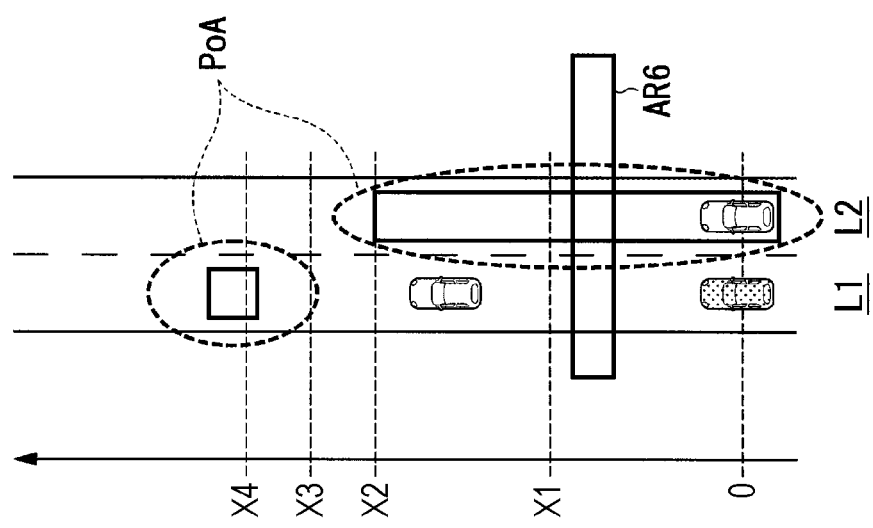

VEHICLE CONTROL APPARATUS, VEHICLE CONTROL METHOD, AND PROGRAM

CROSS REFERENCES TO RELATED APPLICATIONS

The present application claims priority under 35 U.S.C. § 119 to Japanese Patent Application No. 2017-156506, filed Aug. 14, 2017, entitled "Vehicle Control Apparatus, Vehicle Control Method, and Program." The contents of this application are incorporated herein by reference in their entirety.

BACKGROUND

1. Field

The present disclosure relates to a vehicle control apparatus, a vehicle control method, and a program.

2. Description of the Related Art

Driving support apparatuses have hitherto been disclosed (for example, refer to Japanese Patent No. 4949063). Such a driving support apparatus includes a degree-of-risk setting unit that sets the current degree of risk for each target object in the surrounding environment of a host vehicle, a degree-of-risk variation estimating unit that adds up the degrees of risk of the respective target objects and estimates the temporal variation with time of the position of each target object for which the degree of risk is set to estimate the temporal variation with time of the degree of risk resulting from the addition, a minimum calculating unit that calculates the minimum of the degree of risk from the degree of risk in the current width direction of the host vehicle at each position of the host vehicle at each time based on the estimated temporal variation with time of the degree of risk, a cornering control amount calculating unit that calculates a cornering control amount of the host vehicle at least based on the respective minimums, and an avoidance route determining unit that generates an avoidance route of the host vehicle based on the cornering control amount to determine a final avoidance route.

However, since the driving support apparatus disclosed in Japanese Patent No. 4949063 simply calculates the minimum of the degree of risk, the driving support apparatus may select a position at which "the degree of risk of the position is low although the degree of risk around the position is high". Accordingly, the driving support apparatus may not capable of selecting an avoidance rout entirely having a low degree of risk.

SUMMARY

It is desirable to provide a vehicle control apparatus, a vehicle control method, and a program capable of more appropriately setting a route.

(1) The present application describes a vehicle control apparatus including a detecting unit that detects an surrounding object around a vehicle; a first setting unit that sets a first potential for multiple divided areas resulting from division of a road area on which the vehicle is driving based on the road area; a second setting unit that sets a second potential for the divided areas based on the surrounding object detected by the detecting unit; an evaluating unit that calculates an index value by evaluating a potential of a target divided area (any one of the divided areas selected for the calculation) based on the first potential and the second potential set for the target divided area in the multiple divided areas and foreseen information generated for surrounding divided areas (any other divided areas which surround the target divided area) selected from a periphery of the target divided area; and a selecting unit that selects one or more divided areas along a moving direction of the vehicle from the multiple divided areas based on the index value calculated by the evaluating unit. In one embodiment, for example, the index value can be calculated for different target divided areas, typically by selecting those adjacent areas along the vehicle moving direction and/or along a width direction of the vehicle or road so as to assign the index value to the corresponding target divided area. Each index value can be determined in consideration of the first potential and the second potential set for the corresponding target divided area as well as the foreseen information generated for the corresponding other divided areas which surround the corresponding target area. The "potential" can be any information or a variable determined in each divided area based on its relative position in the road area, a distance to the detected surrounding object or the like, indicating a risk potential or possibility useful to evaluate safety for the vehicle traveling in the divided areas.

(2) In (1), the foreseen information may be generated based on the first potential and the second potential set for the surrounding divided areas.

(3) In (1) or (2), the surrounding divided areas may include the divided areas extending to a front side in the moving direction of the vehicle with respect to the target divided area along the moving direction of the vehicle.

(4) In (1) to (3), the number of the divided areas selected along the moving direction of the vehicle may be greater than the number of the divided areas selected along a width direction of the vehicle in the surrounding divided areas.

(5) In (1) to (4), the evaluating unit may determine the divided areas extending in the moving direction of the vehicle, included in the surrounding divided areas, based on a driving state of the vehicle.

(6) In (1) to (5), the selecting unit may select one divided area from the divided areas extending in a width direction of the vehicle in a certain area based on the index value calculated by the evaluating unit while shifting the area in the moving direction of the vehicle.

(7) In (1) to (6), the evaluating unit may calculate the index value of the target divided area in a lane on which the vehicle is driving and, if the divided areas selected by the selecting unit include the divided area having the index value higher than or equal to a predetermined value, may calculate the index value of the divided area outside the lane on which the vehicle is driving.

(8) In (1) to (7), the vehicle control apparatus may further include a route generating unit that generates a route on which the vehicle is driving using the divided area selected by the selecting unit. The word "unit" used in this application may mean a physical part or component of computer hardware or any device including a controller, a processor, a memory, etc., which is particularly configured to perform functions and steps disclosed in the application.

(9) The present application describes a vehicle control method performed by a computer. The vehicle control method includes detecting an surrounding object around a vehicle; setting a first potential for multiple divided areas resulting from division of a road area on which the vehicle is driving based on the road area; setting a second potential for the divided areas based on the detected surrounding object; calculating an index value by evaluating a potential of a target divided area based on the first potential and the second potential set for the target divided area in the multiple divided areas and foreseen information generated for surrounding divided areas selected from a periphery of the target divided area; and selecting one or more divided areas along a moving direction of the vehicle from the multiple divided areas based on the calculated index value.

(10) The present application describes a program causing a computer to perform detecting an surrounding object around a vehicle; setting a first potential for multiple divided areas resulting from division of a road area on which the vehicle is driving based on the road area; setting a second potential for the divided areas based on the detected surrounding object; calculating an index value by evaluating a potential of a target divided area based on the first potential and the second potential set for the target divided area in the multiple divided areas and foreseen information generated for surrounding divided areas selected from a periphery of the target divided area; and selecting one or more divided areas along a moving direction of the vehicle from the multiple divided areas based on the calculated index value.

According to (1) to (3), (6), and (8) to (10), it is possible to set the route more appropriately.

According to (4), it is possible to accurately evaluate the index value by increasing the degree of inclusion of the area in the moving direction of the vehicle.

According to (5), since the range of the surrounding divided areas are appropriately determined based on the driving state, the control in which the unsteadiness of the vehicle is further suppressed is achieved.

According to (7), it is possible to more appropriately control the vehicle by expanding the search area if the index value higher than or equal to a predetermined value is included.

BRIEF DESCRIPTION OF THE DRAWINGS

FIG. 22 illustrates an exemplary scene in which an integrated index value is selected.

DESCRIPTION OF THE PREFERRED EMBODIMENTS

Embodiments of a vehicle control apparatus, a vehicle control method, and a program according to the present disclosure will herein be described with reference to the drawings.

First Embodiment

[Entire Configuration]

Figure 1:
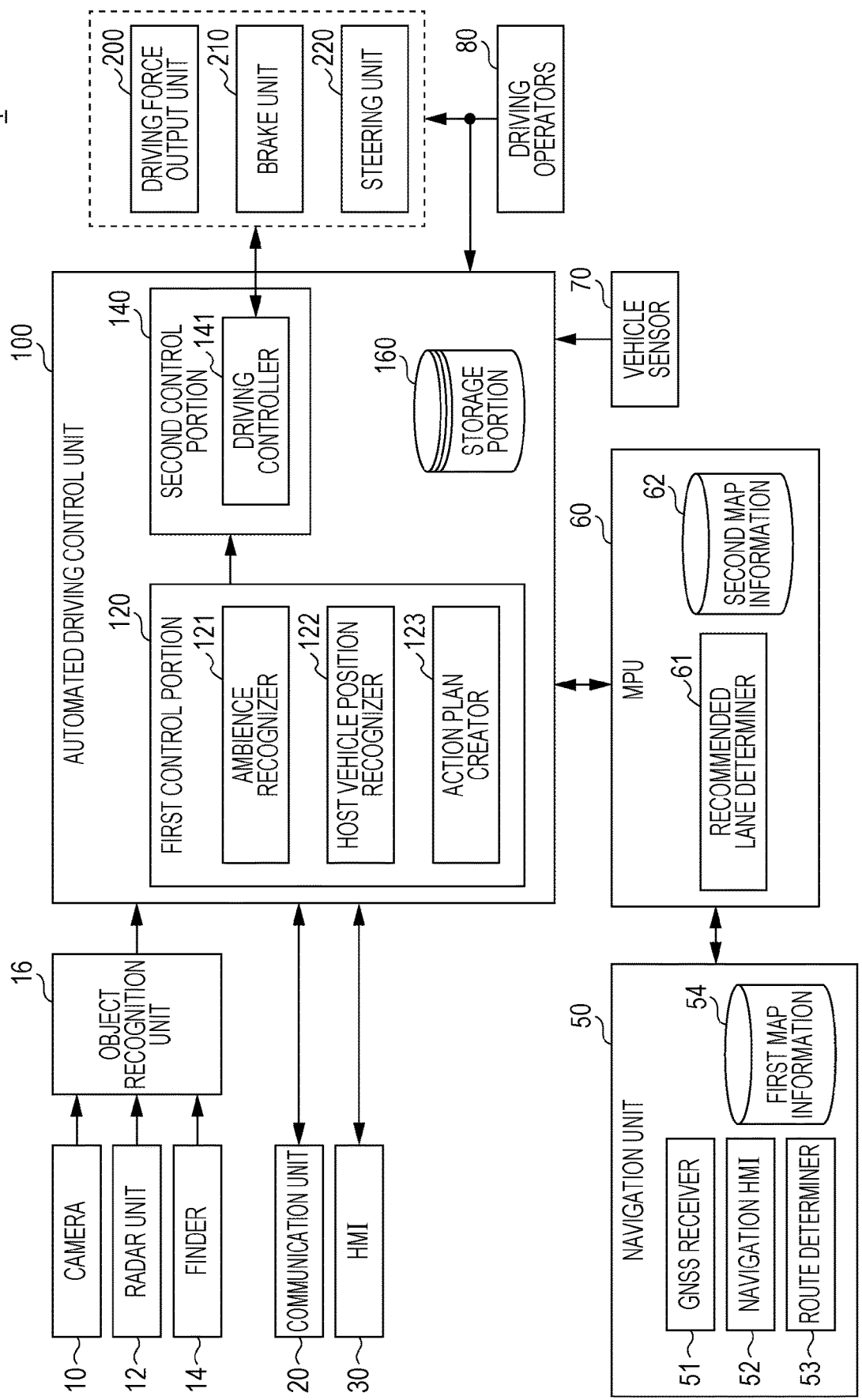
FIG. 1 is a block diagram illustrating an exemplary configuration of a vehicle system including an automated driving control unit.

FIG. 1 is a block diagram illustrating an exemplary configuration of a vehicle system 1 including an automated driving control unit 100. A vehicle in which the vehicle system 1 is mounted is, for example, a two-wheel vehicle, a three-wheel vehicle, or a four-wheel vehicle. The driving source of the vehicle is an internal combustion engine, such as a diesel engine or a gasoline engine, a motor, or a combination of them. The motor operates using power generated by an electric generator connected to the internal combustion engine or power discharged from a secondary cell or a fuel cell.

The vehicle system 1 includes, for example, a camera 10, a radar unit 12, a finder 14, an object recognition unit 16, a communication unit 20, a human machine interface (HMI) 30, a navigation unit 50, a micro processing unit (MPU) 60, a vehicle sensor 70, driving operators 80, the automated driving control unit 100, a driving force output unit 200, a brake unit 210, and a steering unit 220. These units and devices are connected to each other via a multiplex communication line, such as a controller area network (CAN) communication line, a serial communication line, or a wireless communication network. The configuration illustrated in FIG. 1 is only an example. Part of the components may be omitted or another component may be added.

The camera 10 is a digital camera including a solid-state imaging device, such as a charge coupled device (CCD) or a complementary metal oxide semiconductor (CMOS). At least one camera 10 is mounted at an arbitrary position in a vehicle (hereinafter referred to as a host vehicle M) in which the vehicle system 1 is mounted. In capturing of an image in front of the host vehicle M, the camera 10 is mounted on, for example, an upper portion of a front window shield or a rear face of a room mirror. For example, the camera 10 repeatedly and periodically captures images around the host vehicle M. The camera 10 may be a stereo camera.

The radar unit 12 radiates radio waves, such as millimeter waves, around the host vehicle M and detects the radio waves (reflected waves) reflected from an object to detect at least the position (distance and orientation) of the object. At least one radar unit 12 is mounted at an arbitrary position in the host vehicle M. The radar unit 12 may detect the position and the speed of an object using a frequency modulated continuous wave (FM-CW) mode.

The finder 14 is a light detection and ranging or laser imaging detection and ranging (LIDAR) that measures scattered light in response to irradiation light to detect the distance to a target object. At least one finder 14 is mounted at an arbitrary position in the host vehicle M.

The object recognition unit 16 performs a sensor fusion process to the result of the detection of part or all of the camera 10, the radar unit 12, and the finder 14 to recognize, for example, the position, the kind, and/or the speed of an object. The object recognition unit 16 supplies the result of the recognition to the automated driving control unit 100.

The communication unit 20 communicates with another vehicle around the host vehicle M using, for example, a cellular network, a Wi-Fi network, Bluetooth (registered trademark), or dedicated short range communication (DSRC) or communicates with various server apparatuses via a wireless base station.

The HMI 30 presents a variety of information for an occupant in the host vehicle M and accepts an input operation by the occupant. The HMI 30 includes, for example, a touch panel and switches (not illustrated). The touch panel may have a configuration in which a display apparatus, such as a liquid crystal display (LCD) or an organic electroluminescence (EL) display, is combined with a touch pad.

The navigation unit 50 includes, for example, a global navigation satellite system (GNSS) receiver 51, a navigation HMI 52, and a route determiner 53. The navigation unit 50 holds first map information 54 in a storage unit, such as a hard disk drive (HDD) or a flash memory. The GNSS receiver 51 identifies the position of the host vehicle M based on a signal received from a GNSS satellite. The position of the host vehicle M may be identified or complemented by an inertial navigation system (INS) using the output from the vehicle sensor 70. The navigation HMI 52 includes a display unit, a speaker, a touch panel, keys, and so on. Part of the navigation HMI 52 or the entire navigation HMI 52 may be commonly used by the HMI 30 described above. The route determiner 53 determines a route, for example, from the position of the host vehicle M identified by the GNSS receiver 51 (or an arbitrary position that is input) to a destination input by the occupant with the navigation HMI 52 with reference to the first map information 54. In the first map information 54, for example, the shapes of roads are represented by links indicating the roads and nodes connected with the links. The first map information 54 may include information indicating the curvature of each road and/or a point of interest (POI). The route determined by the route determiner 53 is supplied to the MPU 60. In addition, the navigation unit 50 may perform route guidance using the navigation HMI 52 based on the route determined by the route determiner 53. The navigation unit 50 may be realized by, for example, the function of a terminal apparatus, such as a smartphone or a tablet terminal, held by a user. The navigation unit 50 may transmit the current position and the destination to a navigation server through the communication unit 20 and may acquire the route returned from the navigation server.

The MPU 60 functions as, for example, a recommended lane determiner 61 and holds second map information 62 in a storage device, such as an HDD or a flash memory. The recommended lane determiner 61 divides the route supplied from the navigation unit 50 into multiple blocks (divides the route every 100 [m] in the vehicle moving direction) and determines a target lane for each block with reference to the second map information 62. The recommended lane determiner 61 determines, for example, that the host vehicle M drives along the n-th lane from the left side. When a crossroad or a junction exists on the route, the recommended lane determiner 61 determines a recommended lane so that the host vehicle M is capable of driving on a reasonable route in order to move to the crossroad.

The second map information 62 is map information that is more accurate than the first map information 54. The second map information 62 includes, for example, information about the center of each lane or information about the boundaries between the lanes. The second map information 62 may include road information, traffic regulation information, address information (addresses and zip codes), facility information, telephone number information, and so on. The road information includes information indicating the kinds of roads, such as a highway, a toll road, a national road, and a prefectural road, and information indicating the number of lanes on each road, the width of each lane, the gradient of each road, the position of each road (a three-dimensional coordinate including the longitude, the latitude, and the height), the curvature of each curve on each lane, the positions of junction and crossroad points of each lane, and traffic signs provided on each road. The second map information 62 may be updated, if needed, by accessing another apparatus with the communication unit 20.

The vehicle sensor 70 includes, for example, a vehicle speed sensor that detects the speed of the host vehicle M, an acceleration sensor that detects the acceleration, a yaw rate sensor that detects the angular speed around the vertical axis, and an orientation sensor that detects the orientation of the host vehicle M.

The driving operators 80 include operators, such as an accelerator pedal, a brake pedal, a shift lever, and a steering wheel. A sensor that detects the amount of operation or the presence of any operation is mounted in the driving operators 80. The result of the detection by the sensor is supplied to either of the automated driving control unit 100 and the driving force output unit 200, the brake unit 210, and the steering unit 220 or both of them.

The automated driving control unit 100 includes, for example, a first control portion 120, a second control portion 140, and a storage portion 160. Each of the first control portion 120 and the second control portion 140 is realized by a processor, such as a central processing unit (CPU), which executes programs (software). Among the functional units, part or all of the functional units may be realized by hardware (including circuitry), such as a large scale integration (LSI), an application specific integrated circuit (ASIC), a field programmable gate array (FPGA), or a graphics processing unit (GPU) or may be realized by cooperation of the software and the hardware. The storage portion 160 is realized by a non-volatile memory, such as a read only memory (ROM), an electrically erasable and programmable read only memory (EEPROM), or a hard disk drive (HDD), and a volatile memory, such as a random access memory (RAM) or a register.

The first control portion 120 includes an ambience recognizer 121, a host vehicle position recognizer 122, and an action plan creator 123.

The ambience recognizer 121 recognizes the states, such as the positions, the speeds, and the accelerations, of surrounding vehicles based on information supplied from the camera 10, the radar unit 12, and the finder 14 through the object recognition unit 16. The position of each surrounding vehicle may be represented by a representative point, such as the center of gravity or a corner, of the surrounding vehicle or may be represented by an area represented by the outline of the surrounding vehicle. The "state" of each surrounding vehicle may include the acceleration, the jerk, or the "action state" (for example, whether the vehicle is making a lane change or is attempting to make a lane change) of the surrounding vehicle. The ambience recognizer 121 may recognize the positions of objects, such as a guardrail, an utility pole, a parked vehicle, and/or a pedestrian, in addition to the surrounding vehicles.

The host vehicle position recognizer 122 recognizes, for example, the lane (driving lane) on which the host vehicle M is driving and the relative position and the orientation of the host vehicle M with respect to the driving lane. For example, the host vehicle position recognizer 122 compares the pattern (for example, an array of solid lines and broken lines) of a road traffic line, which is acquired from the second map information 62, with the pattern of a road traffic line around the host vehicle M, which is recognized from an image captured by the camera 10, to recognize the driving lane. In the recognition, the position of the host vehicle M acquired from the navigation unit 50 and the result of processing by the INS may be added.

Figure 2:
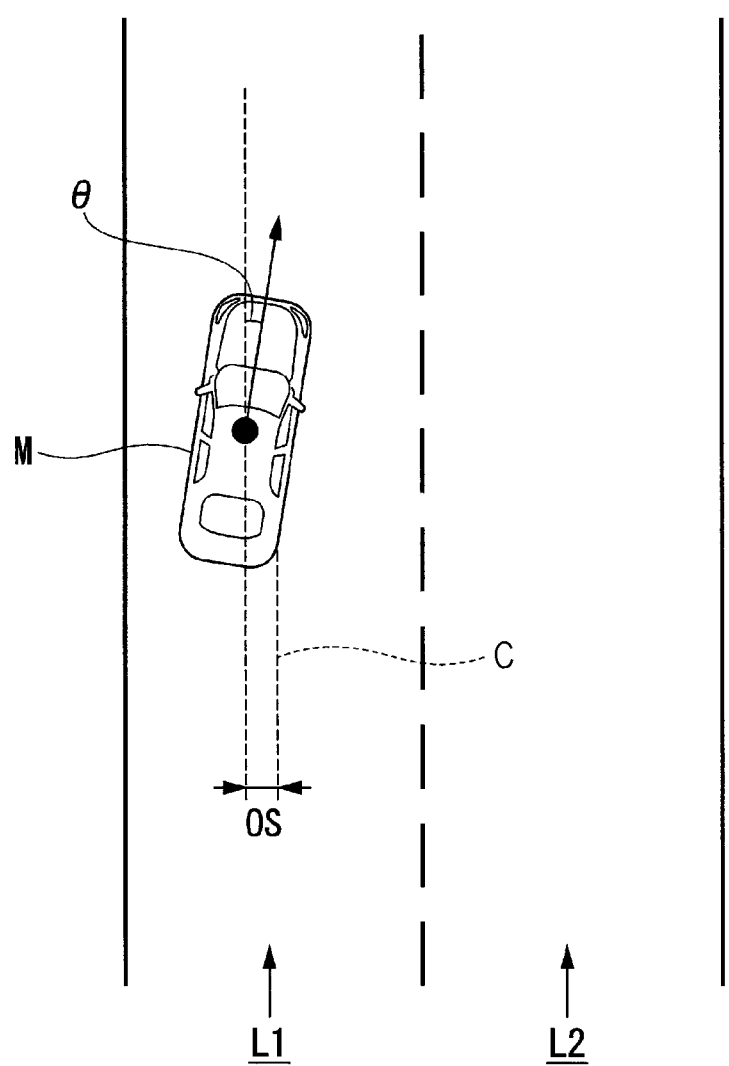
FIG. 2 is a diagram illustrating an example of how the relative position and the orientation of a host vehicle with respect to a driving lane are recognized by a host vehicle position recognizer.

The host vehicle position recognizer 122 recognizes, for example, the position and the orientation of the host vehicle M with respect to the driving lane. FIG. 2 is a diagram illustrating an example of how the relative position and the orientation of the host vehicle M with respect to a driving lane L1 are recognized by the host vehicle position recognizer 122. The host vehicle position recognizer 122 recognizes, for example, a deviation OS from the center C of the driving lane of a reference point (for example, the center of gravity) of the host vehicle M and an angle θ between the host vehicle M and a line resulting from connection of the centers C of the driving lane in the moving direction as the relative position and the orientation of the host vehicle M with respect to the driving lane L1. Alternatively, the host vehicle position recognizer 122 may recognize, for example, the position of a reference point of the host vehicle M with respect to any side end of the driving lane L1 as the relative position of the host vehicle M with respect to the driving lane. The relative position of the host vehicle M recognized by the host vehicle position recognizer 122 is supplied to the recommended lane determiner 61 and the action plan creator 123.

The action plan creator 123 determines events sequentially performed in automated driving so that the host vehicle M drives along the recommended lane determined by the recommended lane determiner 61 and supports the surrounding conditions of the host vehicle M. The events include, for example, a constant-speed driving event in which the host vehicle M is driving on the same driving lane at a constant speed, a following driving event in which the host vehicle M follows a forward vehicle, a lane change event, a junction event, a crossroad event, an emergency stop event, or a handover event for terminating the automated driving and switching to manual driving. During such an event, an action for avoidance may be planned based on the surrounding conditions (the presence of a surrounding vehicle and/or a pedestrian or narrowing of the lane due to a roadwork) of the host vehicle M.

The action plan creator 123 generates a target line on which the host vehicle M will be driving. The target line includes, for example, a speed element. For example, the target line is generated as a collection of target points (line points) which the host vehicle M should reach at multiple future reference times that are set every predetermined sampling time (for example, about several tenths of a second [m]). Accordingly, when the distance between the line points is wide, the host vehicle M drives on the section between the line points at a high speed.

Figure 3:
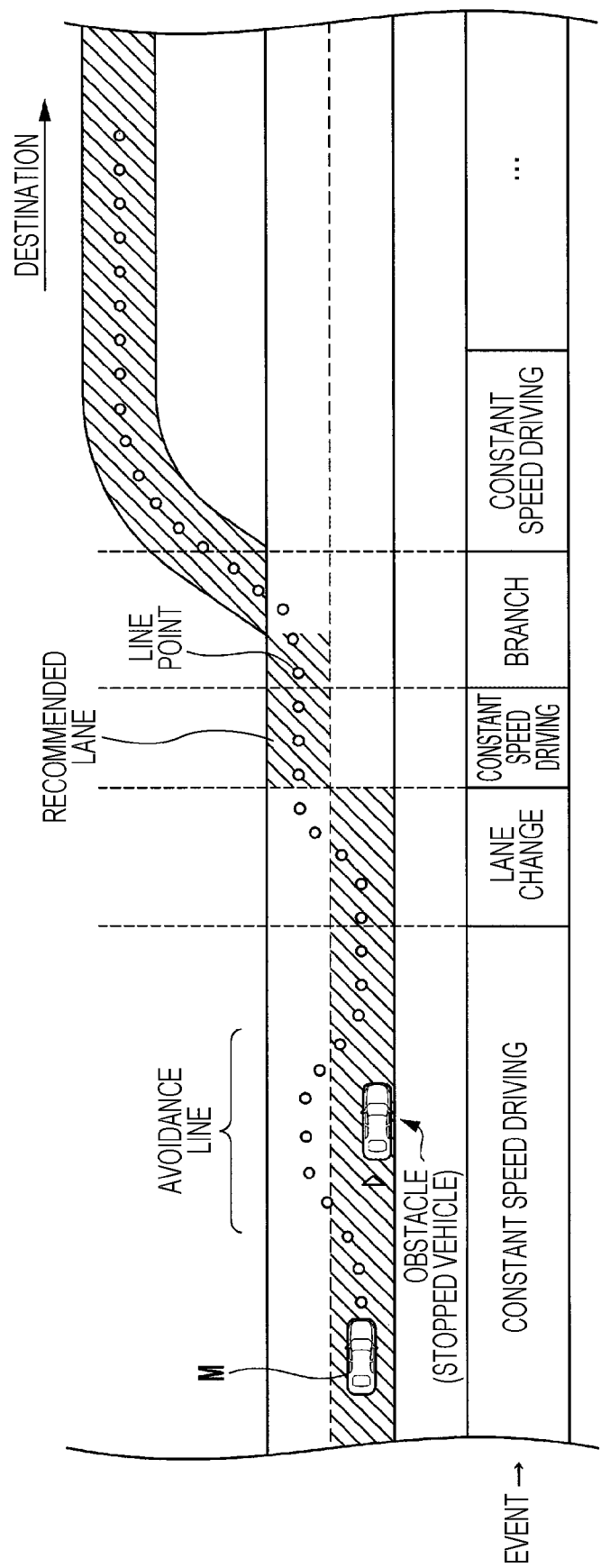
FIG. 3 is a diagram illustrating an example of how a target line is generated based on a recommended lane.

FIG. 3 is a diagram illustrating an example of how the target line is generated based on the recommended lane. As illustrated in FIG. 3, the recommended lane is set so as to be available for driving along the route to the destination. In approaching a position a predetermined distance (may be determined in accordance with the kind of the event) before a switching point of the recommended lane, the action plan creator 123 starts, for example, the lane change event, the crossroad event, or the junction event. If the necessity to avoid an obstacle arises during each event, an avoidance line is generated, as illustrated in FIG. 3.

For example, the action plan creator 123 generates multiple candidates for the target line and selects an optimal target line at that time from the candidates for the target line in terms of the efficiency or the like.

The event occurs, for example, based on the conditions outside the host vehicle M. The event occurring based on the conditions outside the host vehicle M is, for example, an event determined by the action plan creator 123 based on the result of recognition by the ambience recognizer 121 or an event to receive a request signal described below. The action means, for example, that the host vehicle M is caused to take a certain expected behavior by controlling the steering of the host vehicle M or controlling the acceleration and deceleration of the host vehicle M. More specifically, the action when the request signal is received is, for example, interruption of another vehicle in front of the host vehicle M.

Referring back to FIG. 1, the second control portion 140 includes a driving controller 141. The driving controller 141 controls the driving force output unit 200, the brake unit 210, and the steering unit 220 so that the host vehicle M passes along the target line generated by the action plan creator 123 on time.

The driving force output unit 200 outputs the driving force (torque) for the driving of the vehicle to driving wheels. The driving force output unit 200 includes, for example, a combination of the internal combustion engine, the motor, the transmission, and so on and an electronic control unit (ECU) that controls them. The ECU controls the above components in accordance with information supplied from the driving controller 141 or information supplied from the driving operators 80.

The brake unit 210 includes, for example, a brake caliper, a cylinder that applies oil pressure to the brake caliper, an electric motor that causes the cylinder to generate the oil pressure, and a brake ECU. The brake ECU controls the electric motor in accordance with information supplied from the driving controller 141 or information supplied from the driving operators 80 to cause brake torque corresponding to the braking operation to be supplied to each wheel. The brake unit 210 may include a mechanism that applies the oil pressure generated in response to an operation of the brake pedal included in the driving operators 80 to the cylinder through a master cylinder as a backup. The brake unit 210 is not limited to the configuration described above and may be an electronically controlled oil pressure brake unit that controls an actuator in accordance with the information supplied from the driving controller 141 to apply the oil pressure of the master cylinder to the cylinder.

The steering unit 220 includes, for example, a steering ECU and an electric motor. For example, the electric motor applies force to a rack-and-pinion mechanism to change the orientation of a turning wheel. The steering ECU drives the electric motor in accordance with information supplied from the driving controller 141 or information supplied from the driving operators 80 to change the orientation of the turning wheel.

[Detailed Description of Action Plan Creator]

Figure 4:
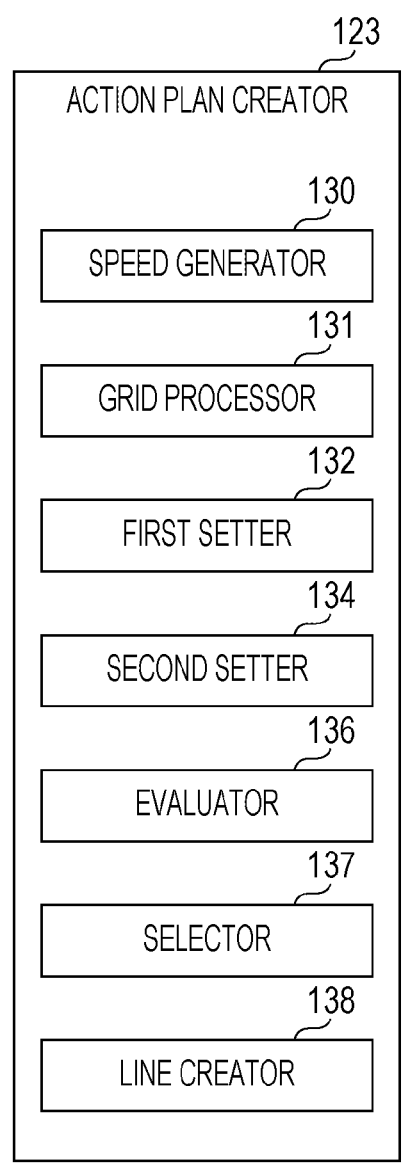
FIG. 4 is a block diagram illustrating an exemplary functional configuration of an action plan creator.

FIG. 4 is a block diagram illustrating an exemplary functional configuration of the action plan creator 123. The action plan creator 123 includes, for example, a speed generator 130, a grid processor 131, a first setter 132, a second setter 134, an evaluator 136, a selector 137, and a line creator 138.

The speed generator 130 generates the current or future speed (target speed) of the host vehicle M based on, for example, the result of recognition by the ambience recognizer 121. The speed is arbitrarily set so as not to exceed a legal speed.

The grid processor 131 supposes a coordinate system (i,j) having axes in a direction (moving direction) along the longitudinal direction of the road and a direction (lateral direction) along the width direction of the road for a road surface area in front of the host vehicle M and virtually sets grids resulting from division of the road surface area into sections having a constant width in the two directions.

Figure 5:
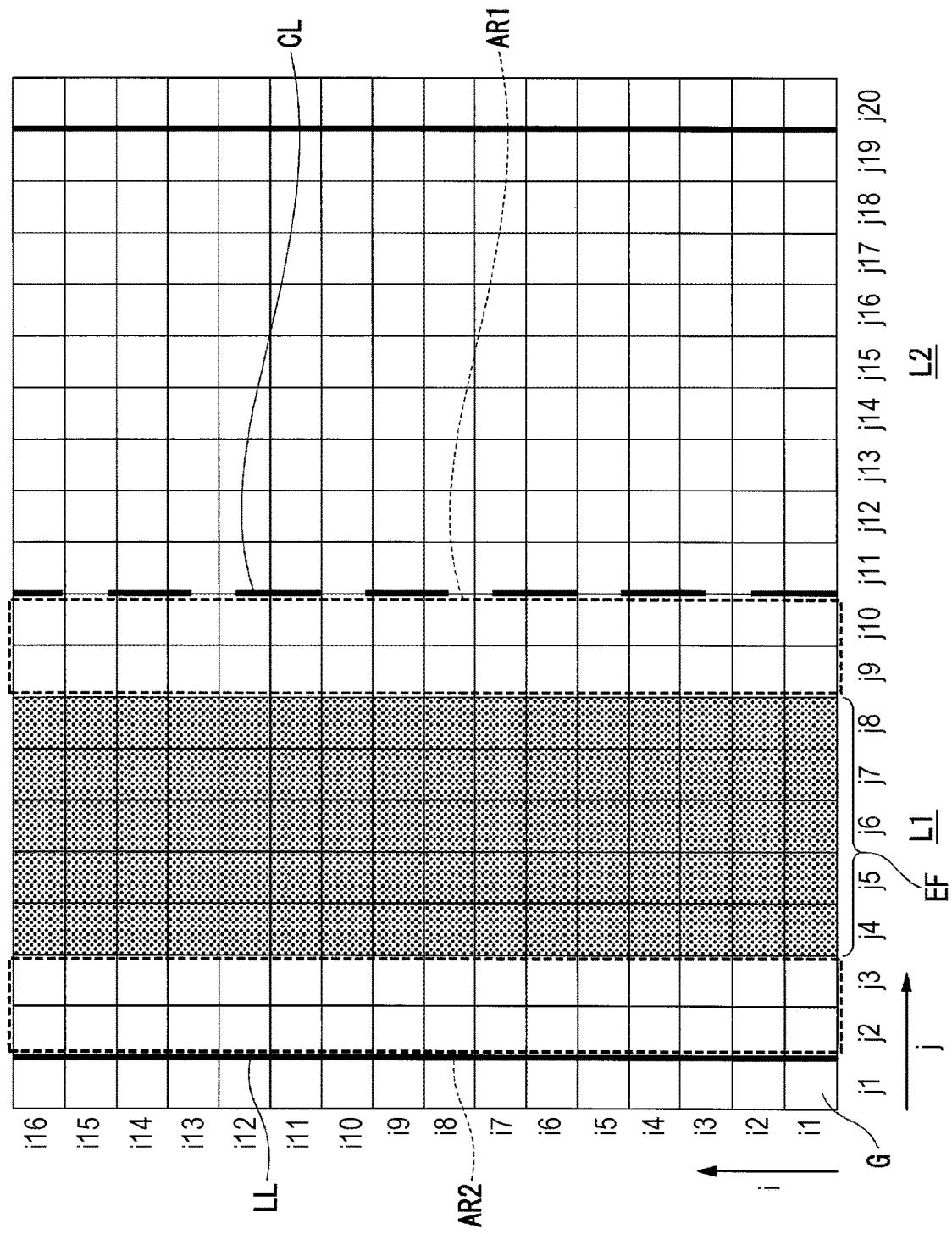
FIG. 5 illustrates an example of grids set on a road surface area.

FIG. 5 illustrates an example of grids G set on the road surface area. A road having two lanes on each side is illustrated in FIG. 5. The width of the grids G in the moving direction may be set so as to be equal to or different from the width of the grids G in the lateral direction. It is not necessary to set the grids G in a grid pattern and the grids G may be set in anther pattern, such as a honeycomb pattern. Each of the grids G is not limited to have a quadrangular shape but may have a circular shape or another polygonal shape. Although the road is illustrated as a straight road in FIG. 5 for simplicity, a similar process is capable of being performed for a curve road through any conversion process.

In addition, the grid processor 131 sets an effective area, which is the target of evaluation by the evaluator 136. The effective area is set within one lane here. The effective area is set, for example, within an effective area EF excluding an area AR1 near a road traffic line CL on the right side and an area AR2 near a road traffic line LL on the left side in the driving lane L1, as illustrated in FIG. 5. The effective area EF is set so that even part of the host vehicle M is not overlapped with the road traffic line CL or LL, for example, when the representative point (for example, the center of gravity) of the host vehicle M is within the effective area EF.

The first setter 132 sets an induced potential Pi based on a road area. The induced potential Pi is an index value set for the road area based on, for example, an object that separates the road (a road traffic line, a guardrail, a center divider, or a shoulder line).

Figure 6:
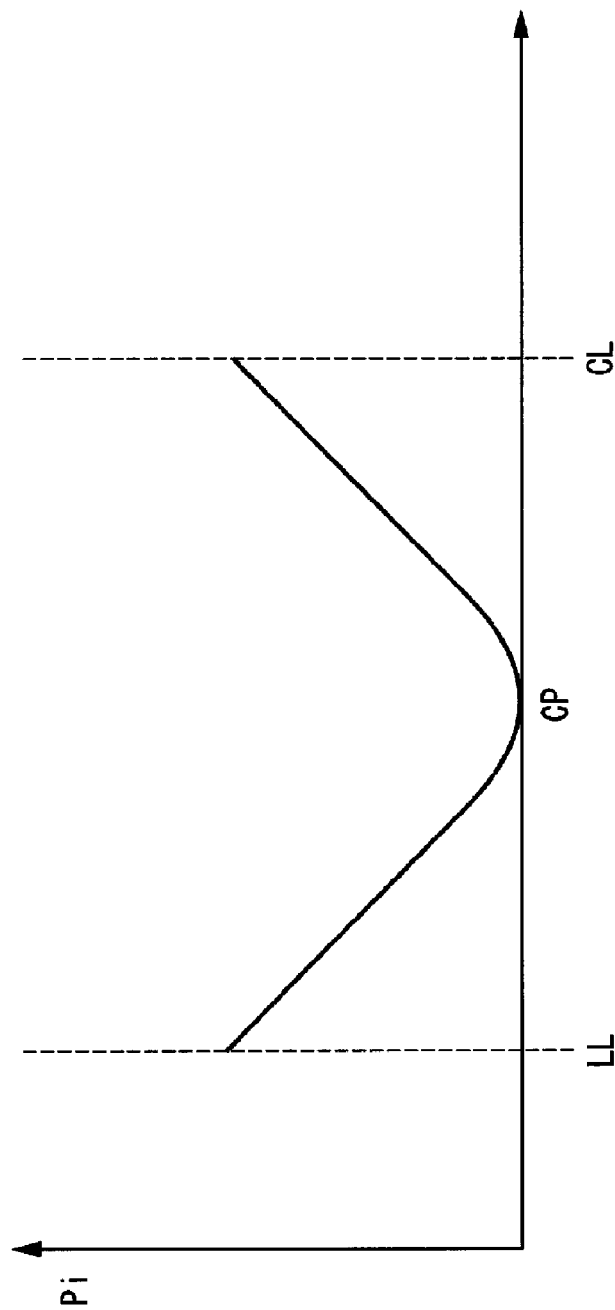
FIG. 6 illustrates an example of an induced potential.

FIG. 6 illustrates an example of the induced potential Pi. Referring to FIG. 6, the vertical axis represents the induced potential Pi and the horizontal axis represents positions in the lane. The induced potential Pi is an index value having a property in which the host vehicle M is induced toward a position having a lower value. For example, the induced potential Pi is set so as to be increased as the host vehicle M is more apart from a center position CP of the lane.

The second setter 134 sets an object potential Po based on the future surrounding conditions of the host vehicle M. The object potential Po is, for example, an index value set for each surrounding object recognized by the ambience recognizer 121. The object potential Po is an index value having a property in which the host vehicle M is induced toward a position having a lower value. For example, the object potential Po is set so as to be decreased as the host vehicle M is more apart from the object.

Figure 7:
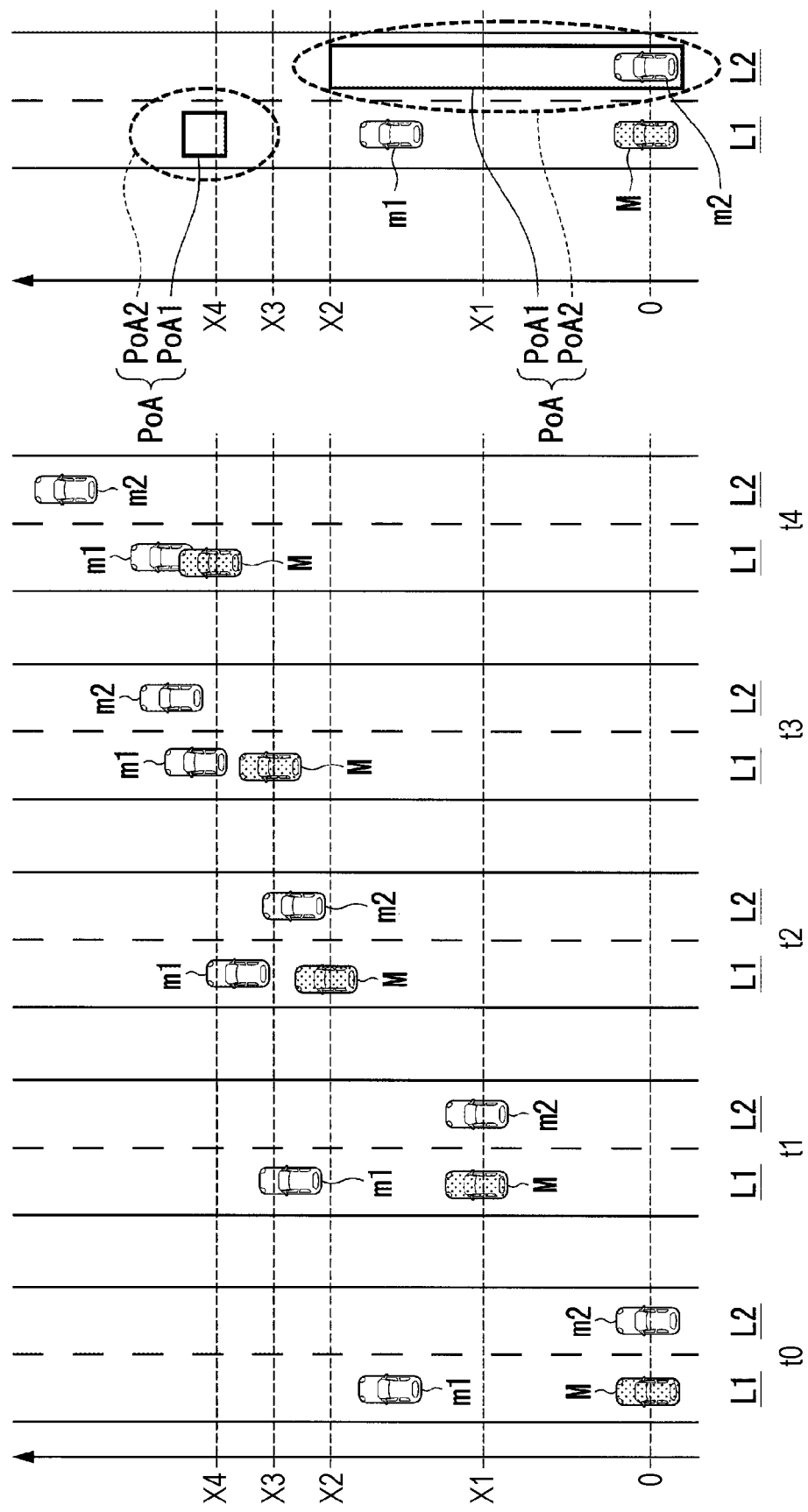
FIG. 7 is an exemplary diagram for describing how to set an object potential.

FIG. 7 is an exemplary diagram for describing how to set the object potential Po. The example in FIG. 7 illustrates a scene in which the second setter 134 sets the object potential Po at a time t0. For example, at the time t0, another vehicle m1 is driving in front of the host vehicle M on the driving lane L1 of the host vehicle M and another vehicle m2 is driving at a position overlapped with the position of the host vehicle M in the moving direction on an adjacent lane L2.

The second setter 134 estimates the positions of the host vehicle M at times t0 to t4 based on the speed generated by the speed generator 130. In the example in FIG. 7, the host vehicle M is located at a position 0 at the time t0, is estimated so as to move to a position X1 at the time t1, is estimated so as to move to a position X2 at the time t2, is estimated so as to move to a position X3 at the time t3, and is estimated so as to move to a position X4 at the time t4. In addition, the second setter 134 estimates the positions of the other vehicles m1 and m2 at the times t0 to t4 based on the behaviors at the time t0 and before the time t0 of the other vehicles m1 and m2. The positions of the respective vehicles at the times t1 to t4 in FIG. 7 indicate the result of the estimation of the positions of the host vehicle M, the other vehicle m1, and the other vehicle m2.

The object potential Po for the other vehicle m1 will now be described. For example, the host vehicle M is estimated so as to catch up with the other vehicle m1 at the time t4. The second setter 134 sets, as an object potential area PoA, an area including a surrounding area PoA2 around an area PoA1 occupied by the other vehicle m1 at the time when the host vehicle M catches up with the other vehicle m1 (or a time slightly before the time). The object potential area PoA is an area representing the distribution of the object potential Po.

Figure 8:
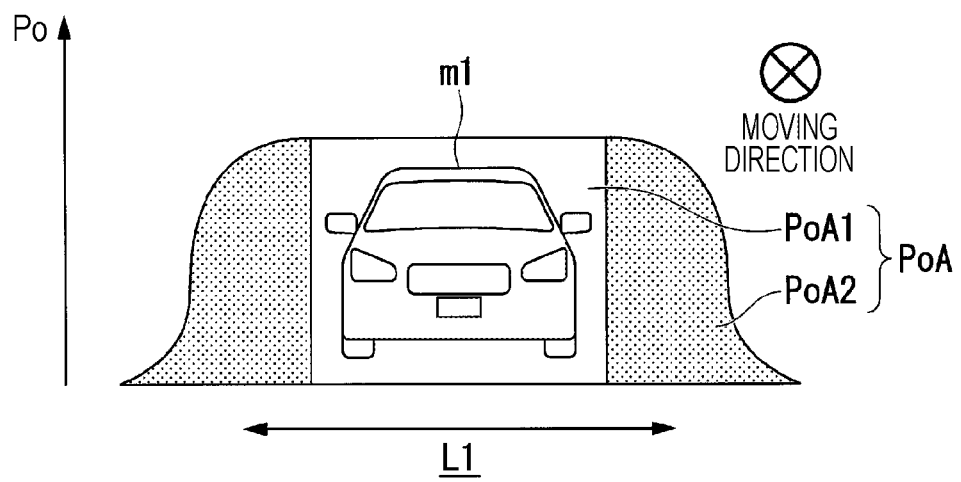
FIG. 8 is a diagram illustrating how an object potential area set for another vehicle looks from the rear side of the other vehicle.

FIG. 8 is a diagram illustrating how the object potential area PoA set for the other vehicle m1 looks from the rear side of the other vehicle m1. The height at each coordinate of the object potential area PoA in FIG. 8 indicates the magnitude of the object potential Po. For example, the object potential Po is set so as to have the highest value in the area PoA1 corresponding to the position of the other vehicle m1 and so as to be gradually decreased with the increasing distance from the area PoA1.

The object potential Po for the other vehicle m2 will now be described. The position of the host vehicle M is estimated so as to be overlapped with at least part of the position of the other vehicle m2 in the moving direction at the times t0 to t2. The second setter 134 sets the object potential area PoA around an area occupied by the positional history of the other vehicle m2 during a time period in which the position of the host vehicle M is overlapped with at least part of the position of the other vehicle m2 in the moving direction (or a time period slightly longer than the time period).

Figure 9:
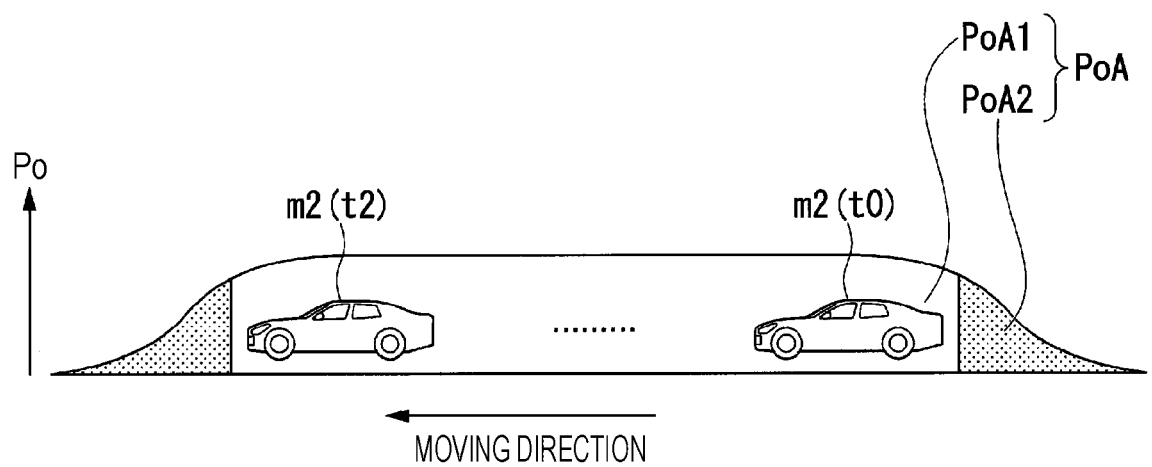
FIG. 9 is a diagram illustrating how the object potential area set for another vehicle looks from a side of the other vehicle.
Figure 10:
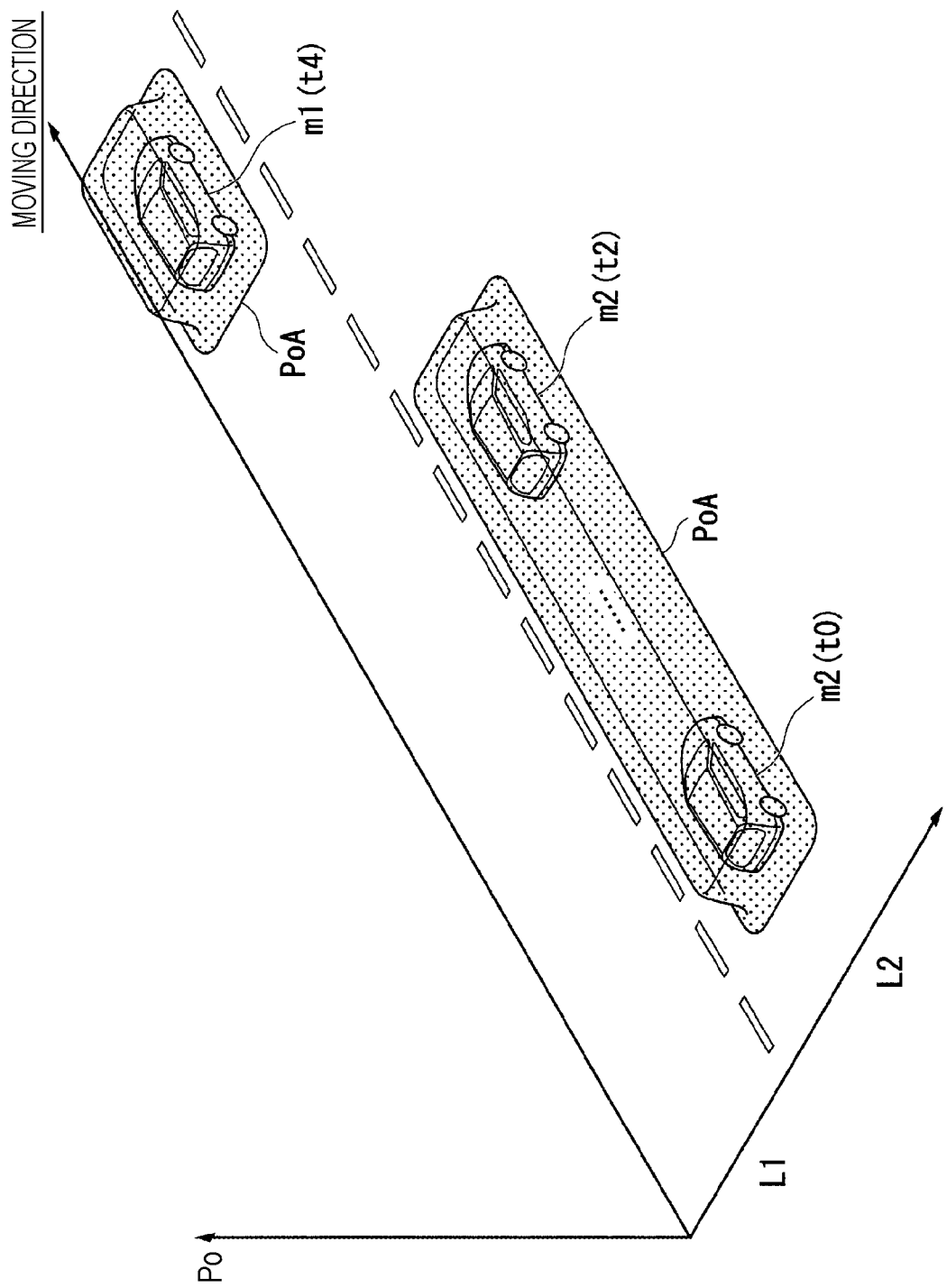
FIG. 10 is a three-dimensional view schematically illustrating the object potential area set in the scene illustrated in FIG. 7.

FIG. 9 is a diagram illustrating how the object potential area PoA set for the other vehicle m2 looks from a side of the other vehicle m2. The height at each coordinate of the object potential area PoA in FIG. 9 indicates the magnitude of the object potential Po. For example, the object potential Po is set so as to have the highest value in the area PoA1 and so as to be gradually decreased with the increasing distance from the area PoA1 in the surrounding area PoA2. FIG. 10 is a three-dimensional view schematically illustrating the object potential area PoA set in the scene illustrated in FIG. 7. The height at each coordinate of the object potential area PoA indicates the magnitude of the object potential Po.

The evaluator 136 calculates an index value by estimating the potential of a target grid G based on the induced potential Pi and the object potential Po set for the target grid G, among the multiple grids (divided areas) G, and foreseen information generated for surrounding grids G selected from the periphery of the target grid G. The foreseen information is generated based on, for example, the future situation of the host vehicle M and around the host vehicle M, which are estimated from the current situation of the host vehicle M. The foreseen information is, for example, information that is set based on the induced potential Pi and the object potential Po set for the surrounding grids G.

The surrounding grids (grids that are targets of the foreseen information) G are, for example, the grids G of a certain number extending along one of the moving direction of the target grid G and the width direction of the host vehicle M or both the moving direction of the target grid G and the width direction of the host vehicle M. For example, the surrounding grids G include the grids G extending to the front side of the host vehicle M in the moving direction with respect to the target grid G along the moving direction of the host vehicle M. The surrounding grids G may be determined based on, for example, the driving state of the host vehicle M. For example, the surrounding grids G are the grids G corresponding to the distance resulting from multiplication of the driving speed of the host vehicle M by a certain time (for example, a few seconds).

Figure 11:
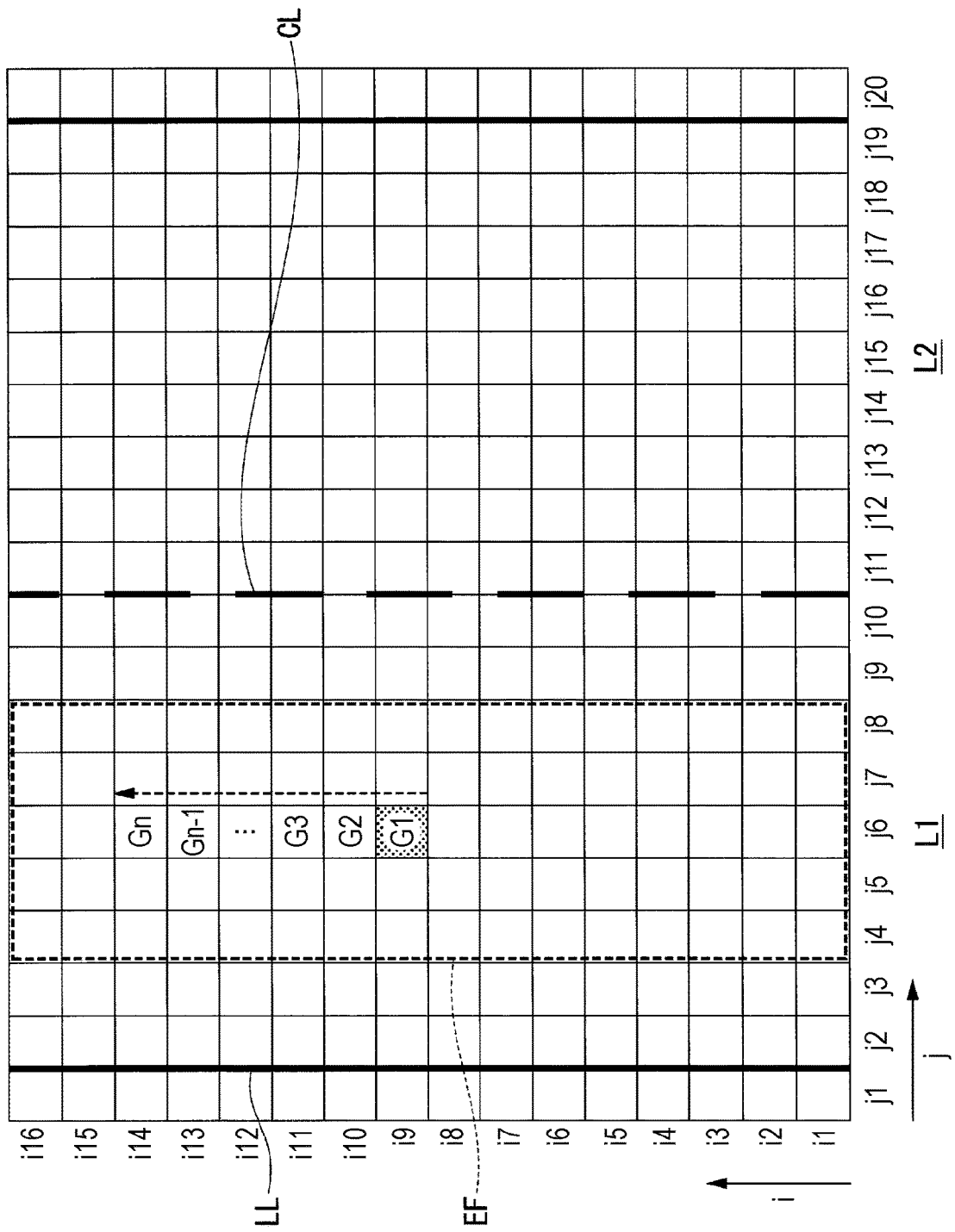
FIG. 11 is an exemplary diagram for describing calculation of an index value.

Next, the evaluator 136 calculates an index value for each grid G in the effective area EF. FIG. 11 is an exemplary diagram for describing calculation of the index value. For example, a grid G1 is focused on. The evaluator 136 calculates an integrated potential based on, for example, the induced potential Pi and the object potential Po set for the grid G1. The integrated potential may be an index value resulting from, for example, addition, weighted sum, or multiplication of the induced potential Pi and the object potential Po or may be an index value calculated by inputting the induced potential Pi and the object potential Po in a certain function or the like.

Next, the evaluator 136 calculates as a total potential of the grids G1 an integrated index value of the grids G1 based on the integrated potentials of the grids G1 and the foreseen information. In the example in FIG. 11, the foreseen information is, for example, information resulting from integration of the induced potential Pi and the object potential Po set for each of grids G2 to Gn. The integrated information is, for example, the integrated potential calculated for each of the grids G2 to Gn in the same manner as in the grid G1. This integrated information is hereinafter referred to as a foreseen index value. The evaluator 136 may multiply the foreseen index value by a weight in the calculation of the foreseen index value. The weight is decreased with the increasing distance from the grid G1.

For example, the total, integrated index value is calculated according to Equation (1) described below. In Equation (1), "Q" denotes the integrated index value of the target grid G, "i" denotes the coordinate of the target grid G in the moving direction, "j" denotes the coordinate of the target grid G in the width direction, "α" denotes the range in the moving direction for which the foreseen information is targeted, and "β" denotes the range in the width direction for which the foreseen information is targeted. Although the range in the width direction for which the foreseen information is targeted is capable of being arbitrarily set in Equation (1), β is set so as to have the value corresponding to one grid in the example in FIG. 11.

$$Q_{i,j} = \sum_{m=i}^{\alpha} \sum_{n=j-\frac{\beta}{2}}^{j+\frac{\beta}{2}} q(m, n) \tag{1}$$

In this case, the number of the grids G selected along the moving direction (i direction) of the host vehicle M, among the surrounding grids G, may be greater than the number of the grids G selected along the width direction (j direction) of the host vehicle M.

The induced potential Pi, the object potential Po, the integrated potential, and so on may be calculated for the grids G outside the effective area EF. This enables the integrated index value to be accurately calculated for the grids G at the end of the effective area EF at the moving direction side. In the calculation of the integrated index value for the grids G at the end of the effective area EF at the moving direction side, the index values of the grids G at the end may be calculated using a predetermined value.

Figure 12:
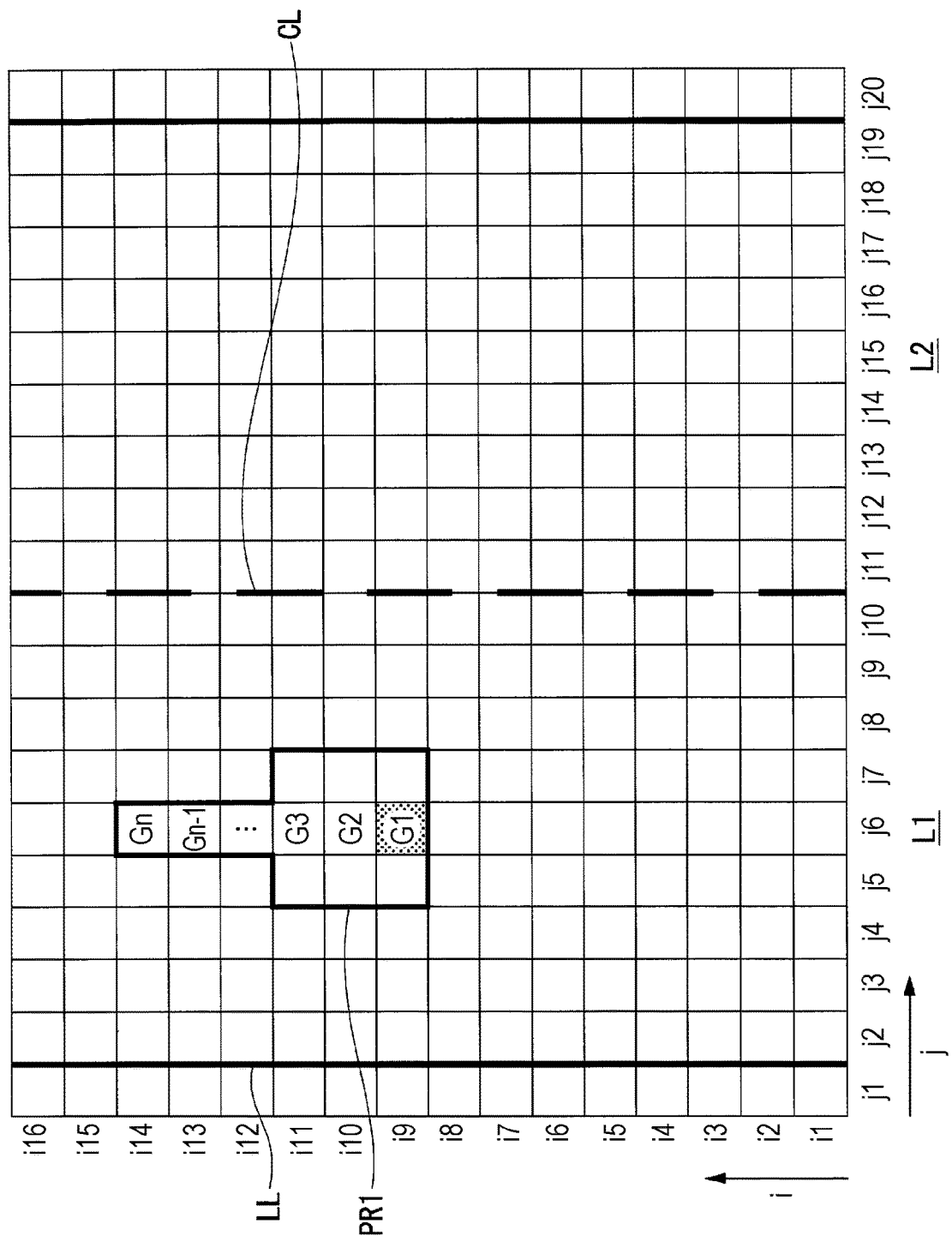
FIG. 12 illustrates an example of surrounding grids.

The surrounding grids G may cover a range having a shape other than a rectangle, a circle, and an ellipse, as described below. The surrounding grids G are not limited to have a square shape or a rectangle shape and may cover a polygonal range. FIG. 12 illustrates another example of the surrounding grids G. The surrounding grids G may be, for example, a range PR1 including the grids G of an "n (arbitrary natural number)-number" from the target grid G in the moving direction and the grids G of a "k (arbitrary natural number)-number" from the target grid G in the width direction. For example, when the grid G1 is focused on, the surrounding grids G may be the range PR1 including the grids G2 to Gn of an "n (arbitrary natural number)-number" from the target grid G1 in the moving direction, the grids G adjacent to the grid G1 in the width direction, and two grids G extending in the moving direction with respect to each of the adjacent grids G.

Referring back to FIG. 4, the selector 137 selects one or more grids G along the moving direction of the vehicle from the multiple grids G based on the integrated index value calculated by the evaluator 136 in the effective area EF. The grid G to be selected is the grid G having the lowest integrated index value, among the grids G extending in the lateral direction.

Figure 13:
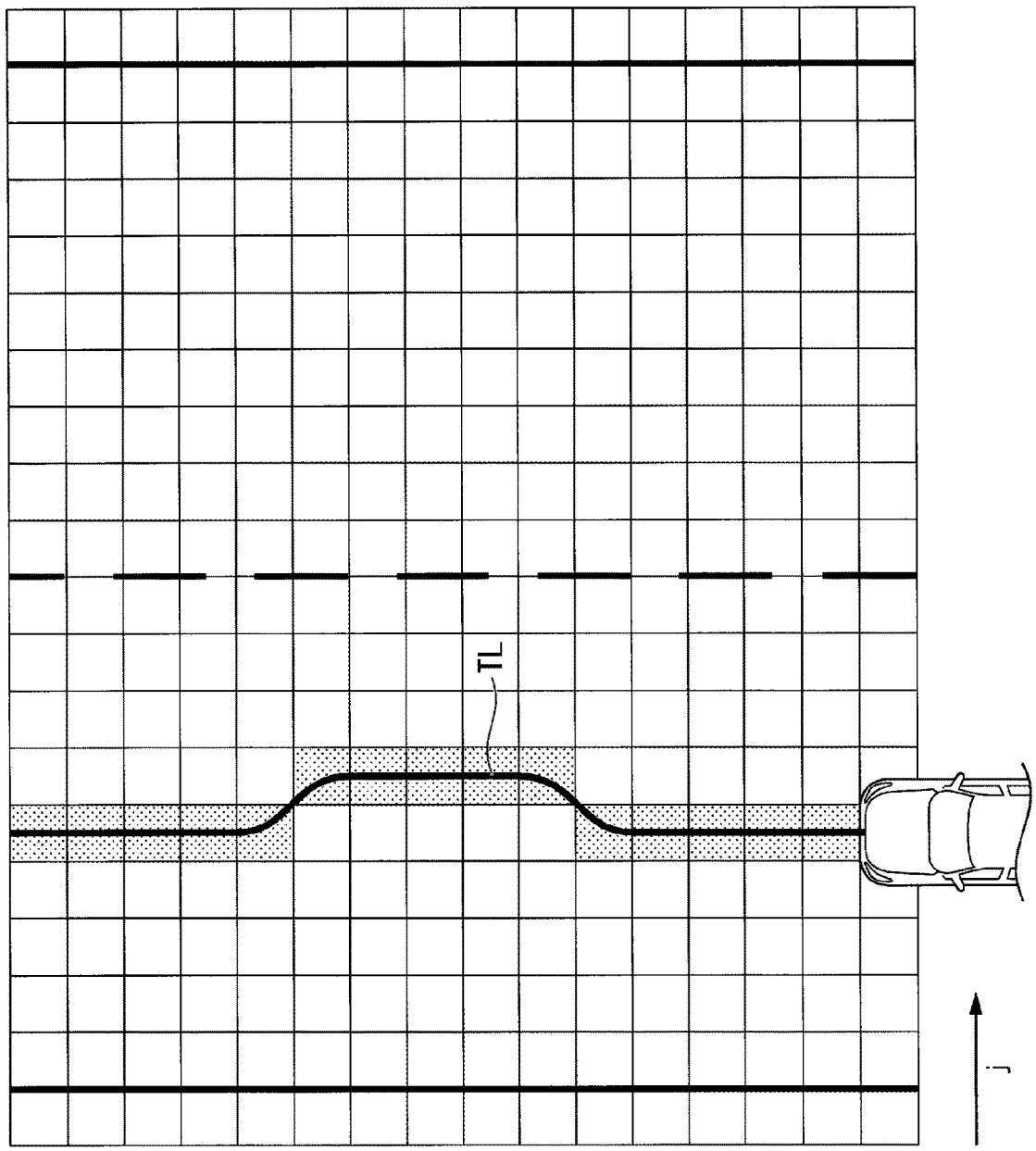
FIG. 13 illustrates an example of a target line generated based on selected grids.

The line creator 138 generates a smooth curve that is as close as possible to the grid G selected by the selector 137 and that is represented by a spline function (or an Hermite function) or the like and generates a target line TL on the curve. FIG. 13 illustrates an example of the target line TL generated based on the selected grids G.

[Flowchart]

Figure 14:
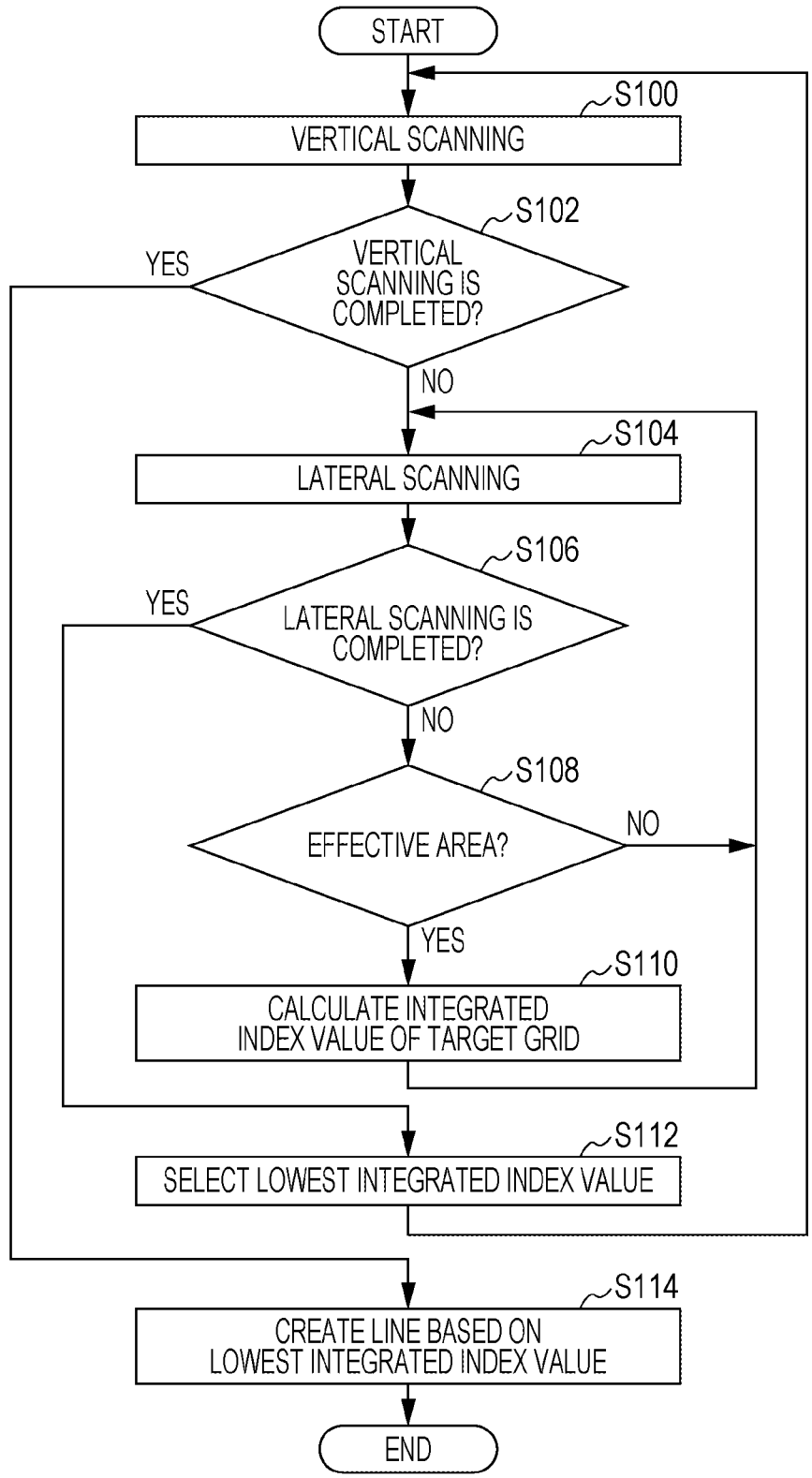
FIG. 14 is a flowchart illustrating an exemplary process performed by the action plan creator.

FIG. 14 is a flowchart illustrating an exemplary process performed by the action plan creator 123. Referring to FIG. 14, in Step S100, the grid processor 131 performs vertical scanning. For example, in the example in FIG. 11, the grids G on "i1 row" are first selected. In Step S102, the grid processor 131 determines whether the vertical scanning is completed. Specifically, the grid processor 131 determines whether the vertical scanning of a scanning target range is completed. In the example in FIG. 11, the scanning target range in the vertical direction includes the grids G corresponding to "i1" row to "i16 row".

If the vertical scanning is not completed (NO in Step S102), in Step S104, the grid processor 131 performs lateral scanning based on the grids G subjected to the vertical scanning. For example, in the example in FIG. 11, a grid "j1" is first selected.

In Step S106, the grid processor 131 determines whether the lateral scanning is completed. Specifically, the grid processor 131 determines whether the lateral scanning of the scanning target range is completed. In the example in FIG. 11, in the case of the row "i1", the grid processor 131 determines whether the grids G from the grid G defined by "i1,j1" to the grid G defined by "i1,j20" are selected.

If the lateral scanning is not completed (NO in Step S106), in Step S108, the grid processor 131 determines whether the grid G (the target grid G) scanned in Step S104 is within the effective area. If the grid processor 131 determines that the grid G (the target grid G) is not within the effective area (NO in Step S108), the process goes back to Step S104. In this case, the grid processor 131 selects the grid G adjacent to the grid G scanned in Step S104 (for example, the grid G defined by "i1" and "j2").

If the grid G (the target grid G) is within the effective area (YES in Step S108), in Step S110, the evaluator 136 calculates the integrated index value of the target grid G through the process described above.

If the lateral scanning is completed (YES in Step S106), in Step S112, the selector 137 selects the lowest integrated index value, among the integrated index values calculated in Step S110. After Step S112, when the grid G corresponding to "i1" is selected in the previous routine, in Step S100, the grid processor 131 selects the grids G corresponding to "i2 row".

If the vertical scanning is completed (YES in Step S102), in Step S114, the line creator 138 generates a line based on each integrated index value selected in Step S110. Then, the process of one routine in the flowchart in FIG. 14 is terminated.

Since the reference of the lateral positions appropriate for the situation around the vehicle are determined through the above process, it is possible to determine the route more appropriately.

[Example of Creation of Lane to which Vehicle Makes a Lane Change]

Figure 15:
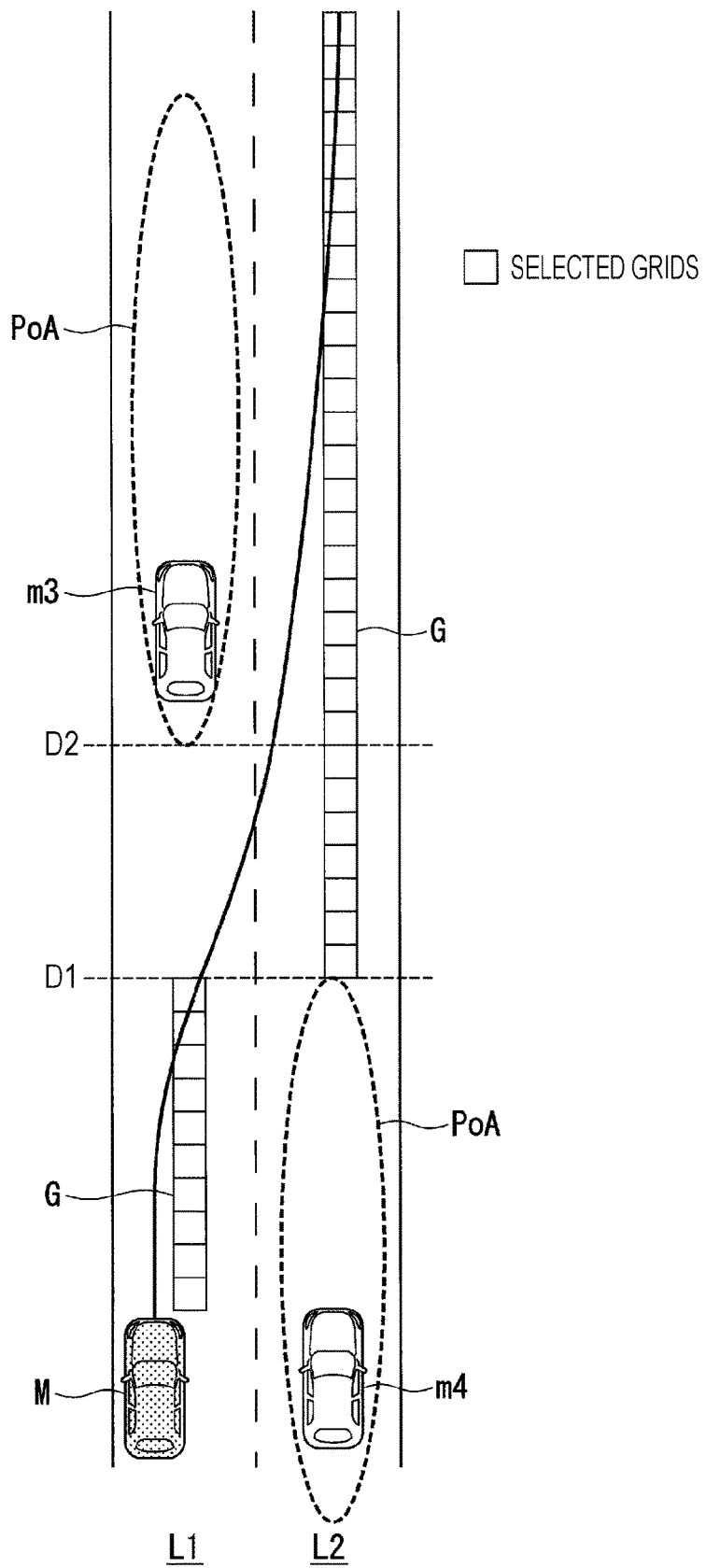
FIG. 15 illustrates an exemplary scene in which a lane to which the host vehicle makes a lane change is generated.

FIG. 15 illustrates an exemplary scene in which a lane to which the host vehicle M makes a lane change is generated. Although a plan of the line change is not generated in the example in FIG. 15, a lane to which the host vehicle M makes a lane change is generated in accordance with the surrounding environment of the host vehicle M in the exemplary scene in FIG. 15. In the example in FIG. 15, the effective area is set for the grids G in the lane L1 and the lane L2. The second setter 134 calculates the object potential areas PoA for another vehicle m3 and another vehicle m4 through the process described above. The evaluator 136 calculates the integrated index value based on, for example, the integrated potentials set for the grids G and the foreseen information. The selector 137 selects the grid G corresponding to the lowest integrated index value for each grid row extending in the lateral direction.

In the example illustrated in FIG. 15, since the object potential Po corresponding to the other vehicle m4 is set on the lane L2 to a position D1, the grid G corresponding to the lowest integrated index value appears in the lane L1 to the position D1.

Beyond the position D1, the grid G corresponding to the lowest integrated index value appears in the lane L2, as described below. In the example in FIG. 15, the object potential Po is not set on the lane L2 beyond the position D1 and the object potential area PoA corresponding to the other vehicle m3 is set on the lane L1 beyond a position D2. Accordingly, from the position D1 to the position D2, the lowest integrated index value appears on the lane L2 because the surrounding grids G include the grids for which the object potential area PoA is set. Since the object potential area PoA corresponding to the other vehicle m3 exists on the lane L1 also beyond the position D2, the lowest integrated index value appears on the lane L2.

As described above, since the lateral positions where access to an object existing around the host vehicle M is avoided are determined by the object, it is possible to set the route more appropriately.

The evaluator 136 may calculate the integrated index value of the grids G in the lane on which the host vehicle M is driving and, if the grids G selected by the selector 137 include the grid G having the integrated index value higher than or equal to a predetermined value, may calculate the integrated index value resulting from evaluation of the potential of the grids G outside the lane on which the host vehicle M is driving.

When effective grids are set in the lane L1, for example, in the situation illustrated in FIG. 15, the effective area is set in the lane L1 in principle. However, when the integrated index value lower than the predetermined value does not exist in the lane L1 after the host vehicle M reaches the position D1, the range of the effective area may be extended to the lane L2 (the range where the integrated index value lower than the predetermined value is searched for may be extended). This enables the grid G having the integrated index value lower than the predetermined value to be selected.

According to the first embodiment described above, since one or more grids G along the moving direction of the vehicle are selected from the multiple grids G based on a first potential and a second potential set for the target grid G, among the multiple grids G, and the foreseen information set for the surrounding grids G and based on the index value calculated by the evaluator 136, it is possible to set the route more appropriately.

Second Embodiment

A second embodiment will now be described. The control in the mode in which the host vehicle M is driving while keeping the lane is described in the first embodiment. In contrast, a process when a lane change preparing mode or a lane change mode is performed by the action plan creator 123 will be described in the second embodiment. The difference from the first embodiment will be described below.

In the lane change, the action plan creator 123 performs the lane change preparing mode or the lane change mode. The lane change preparing mode is a mode for determining whether the lane change mode is to be performed. After the lane change preparing mode is performed, if any object does not exist near the host vehicle M and any object having the relative speed in the relationship with the host vehicle M does not exist in front of the host vehicle M and on the lateral rear side of the host vehicle M, the host vehicle M performs the lane change mode.

[Lane Change Preparing Mode]

Figure 16:
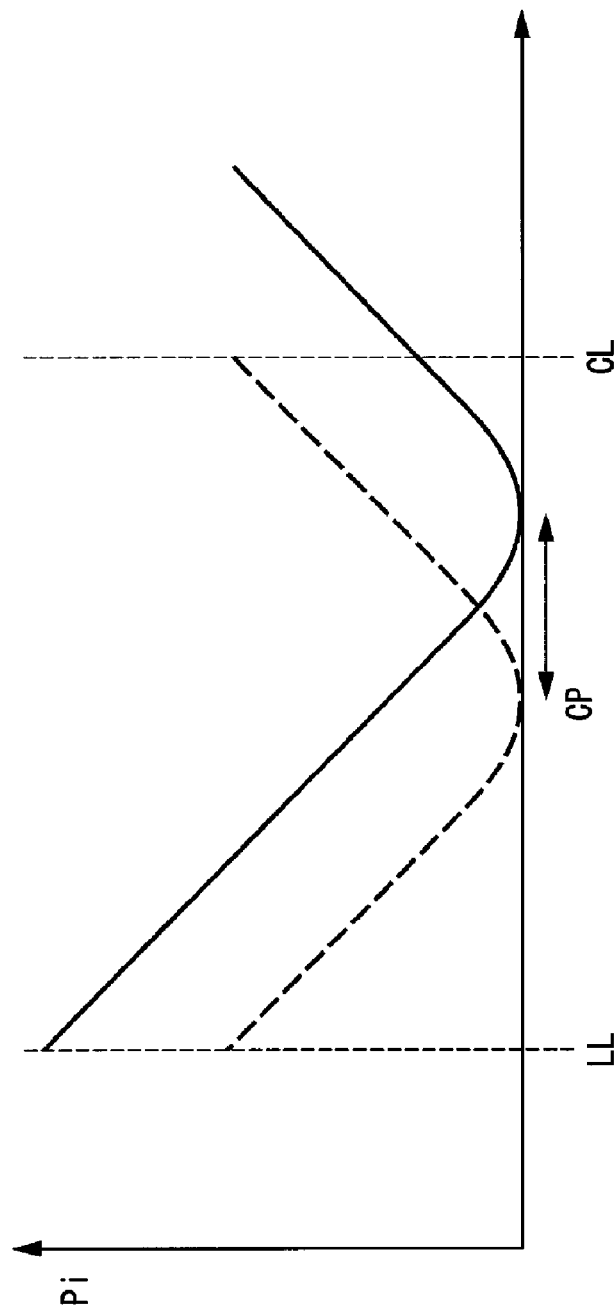
FIG. 16 illustrates an example of the induced potential in a lane change preparing mode.

In the lane change preparing mode, the range of the effective area EF is within the driving lane. In the lane change preparing mode, the induced potential Pi is set so as to have the minimum value at a position that is offset from the center position CP of the lane L1 on which the host vehicle M is driving toward the lane to which the host vehicle M is to make a lane change. FIG. 16 illustrates an example of the induced potential Pi in the lane change preparing mode. Referring to FIG. 16, a broken line indicates the induced potential Pi before the offset and a sold line indicates the induced potential Pi after the offset.

Figure 17:
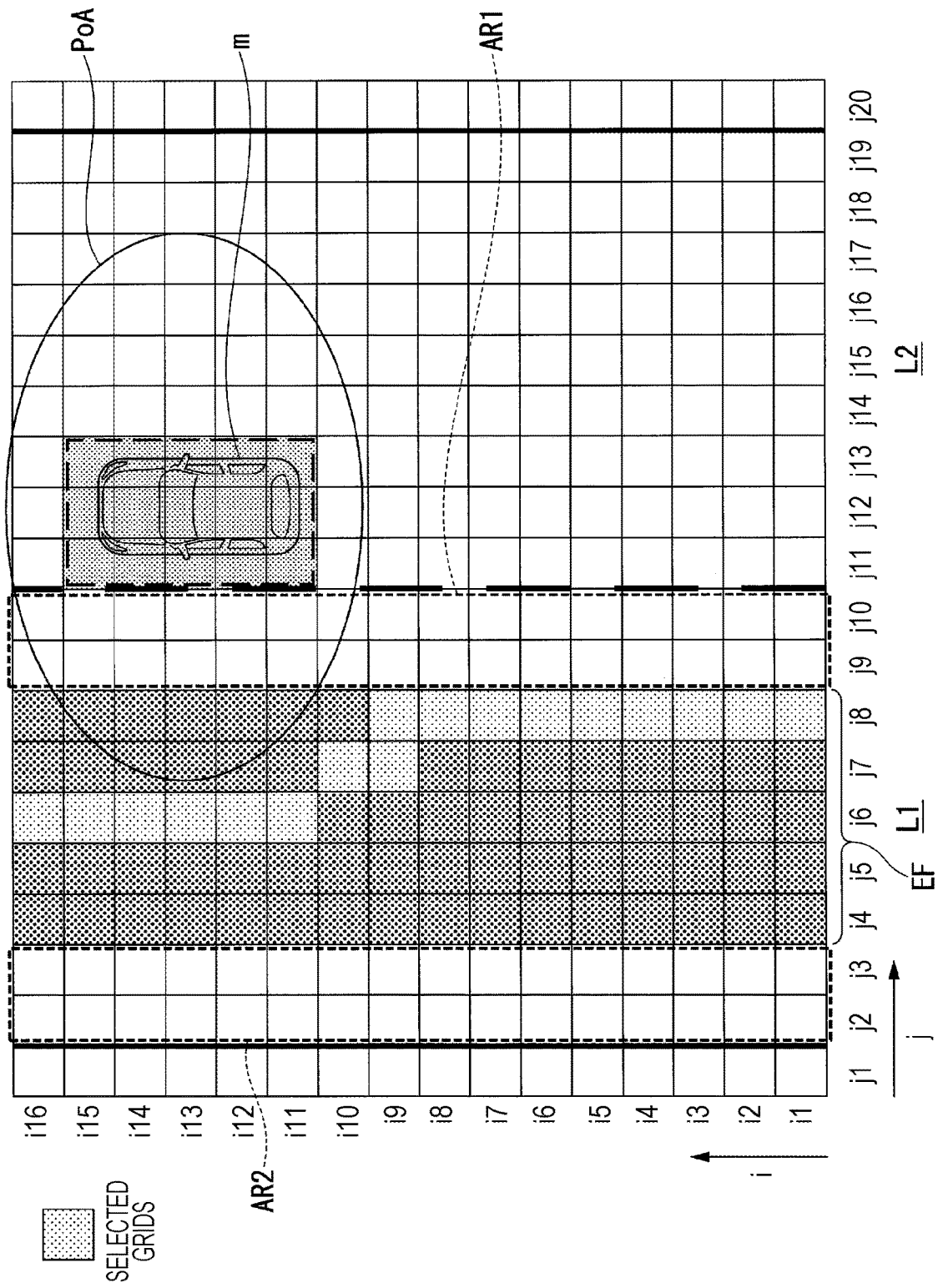
FIG. 17 illustrates exemplary grids selected by a selector in the lane change preparing mode.

FIG. 17 illustrates an example of the grids G selected by the selector 137 in the lane change preparing mode. As described above, since the induced potential Pi is offset toward the lane side (the road traffic line CL side) to which the host vehicle M is to make a lane change in the lane change preparing mode, the grids G selected by the selector 137 are toward the road traffic line CL in consideration of only the effect of the induced potential Pi. However, when any object (another vehicle m) exists on the lane to which the host vehicle M is to make a lane change and the host vehicle M will catch up with the other vehicle m, the selected grids G are toward the center of the lane L1 due to the effect of the object potential area PoA beyond the grids G (for example, an i9 row) corresponding to the time when the host vehicle M catches up with the other vehicle m.

[Lane Change Mode]

Figure 18:
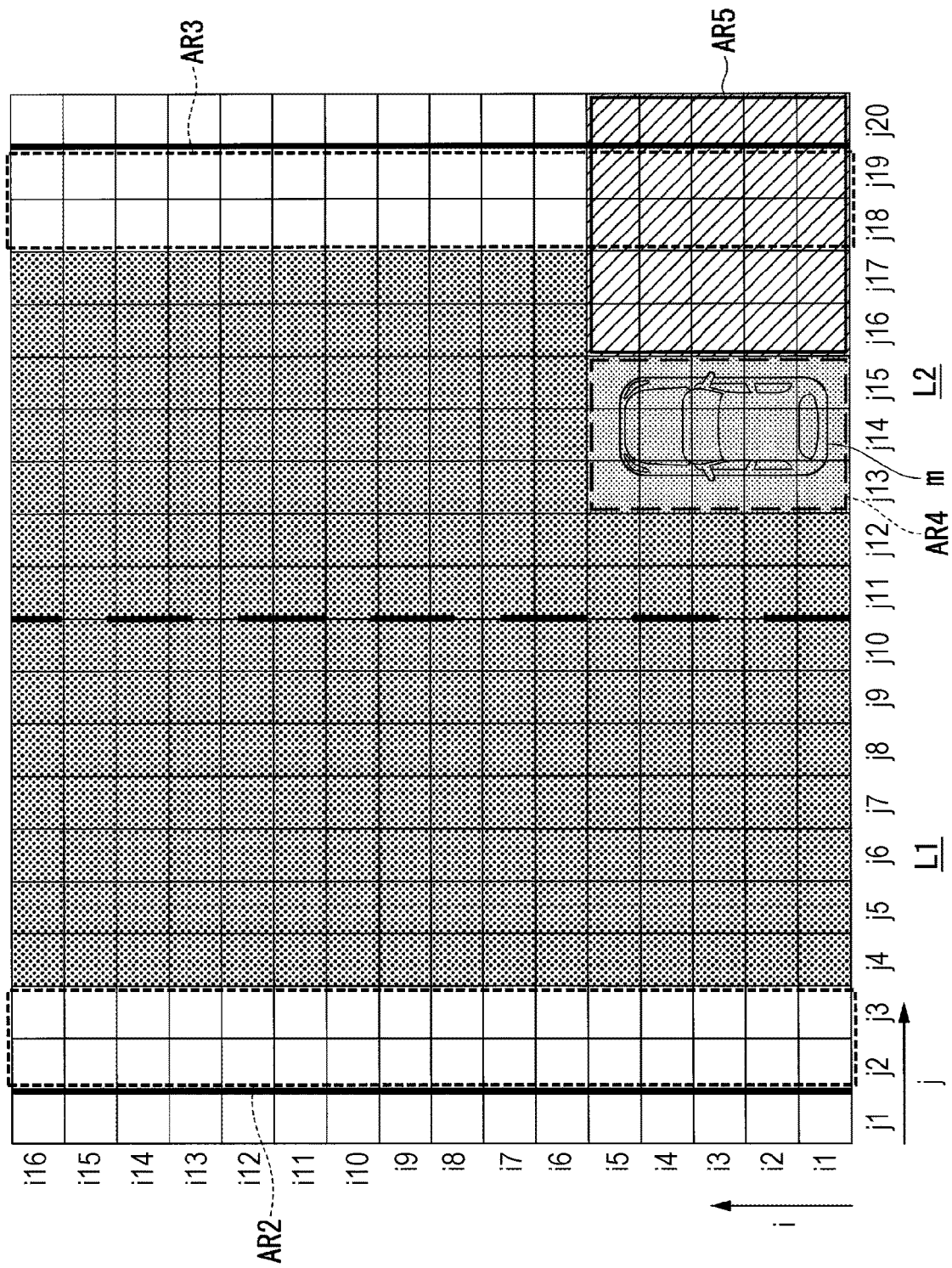
FIG. 18 illustrates an exemplary effective area in a lane change mode.

FIG. 18 illustrates an example of the effective area in the lane change mode. In the example in FIG. 18, the other vehicle m is driving on the lane to which the host vehicle M is to make a lane change. In the lane change mode, the effective area EF is set for the lane on which the host vehicle M is driving and the lane to which the host vehicle M is to make a lane change. However, the area AR2 near the road traffic line LL on the left side in the driving lane L1, an area AR3 near the road traffic line CL, a close attention area AR4 occupied by the object, and a virtual close attention area AR5 on the opposite side of the close attention area AR4 with respect to the host vehicle M are excluded.

Figure 19:
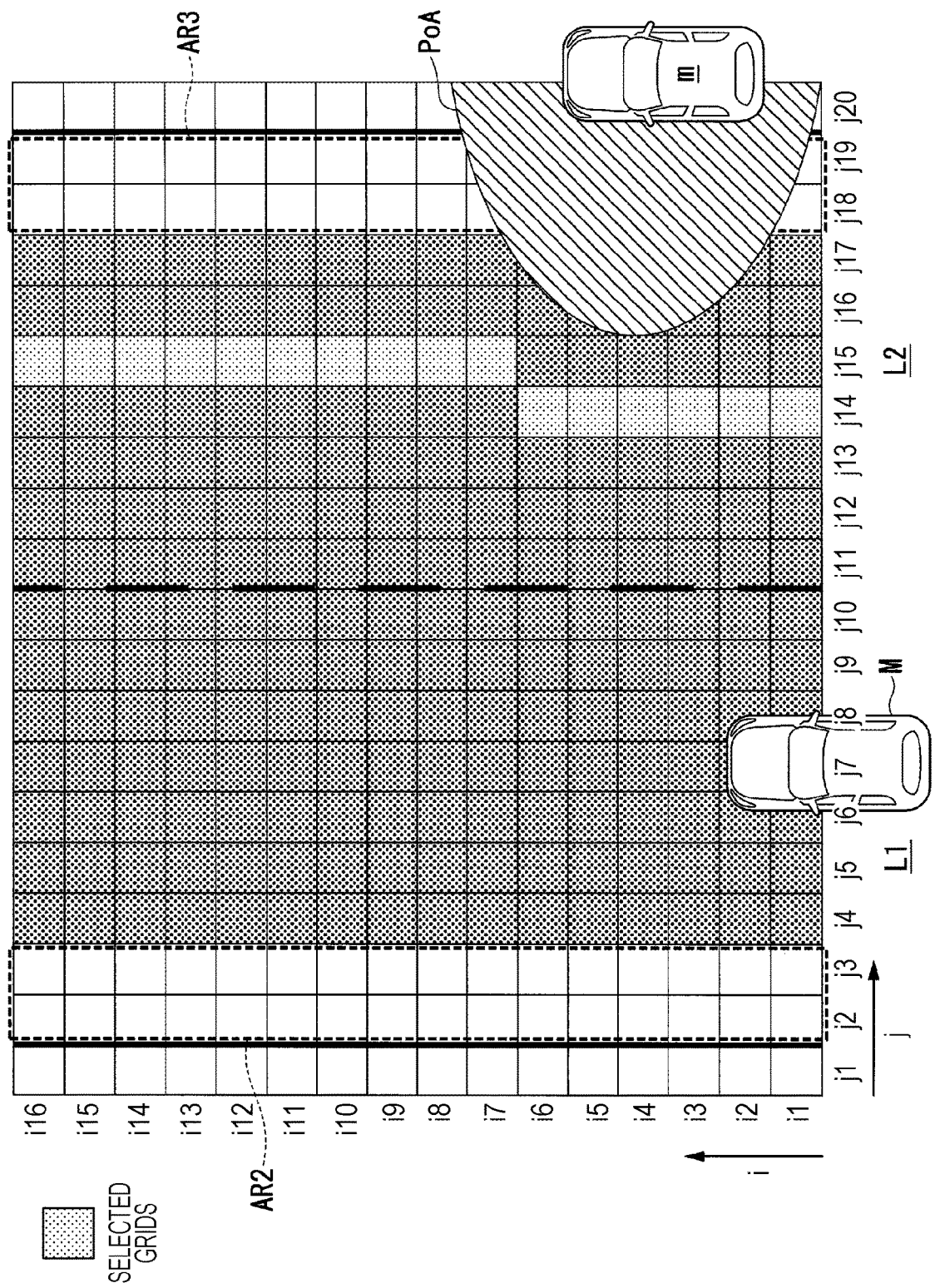
FIG. 19 illustrates exemplary grids selected by the selector in the lane change mode.

In the lane change mode, the induced potential Pi is set so as to have the minimum value at the center position in the lane to which the host vehicle M is to make a lane change. FIG. 19 illustrates an example of the grids G selected by the selector 137 in the lane change mode. As illustrated in FIG. 19, the grids G are selected based on the induced potential Pi, which is set so as to have the minimum value at the center position in the lane to which the host vehicle M is to make a lane change, and the integrated index value calculated using the object potential Po. The grids G that are selected are hereinafter referred to as "selected grids G". The selected grids G are selected so as not to be close to the object potential area PoA, as illustrated in FIG. 19.

Figure 20:
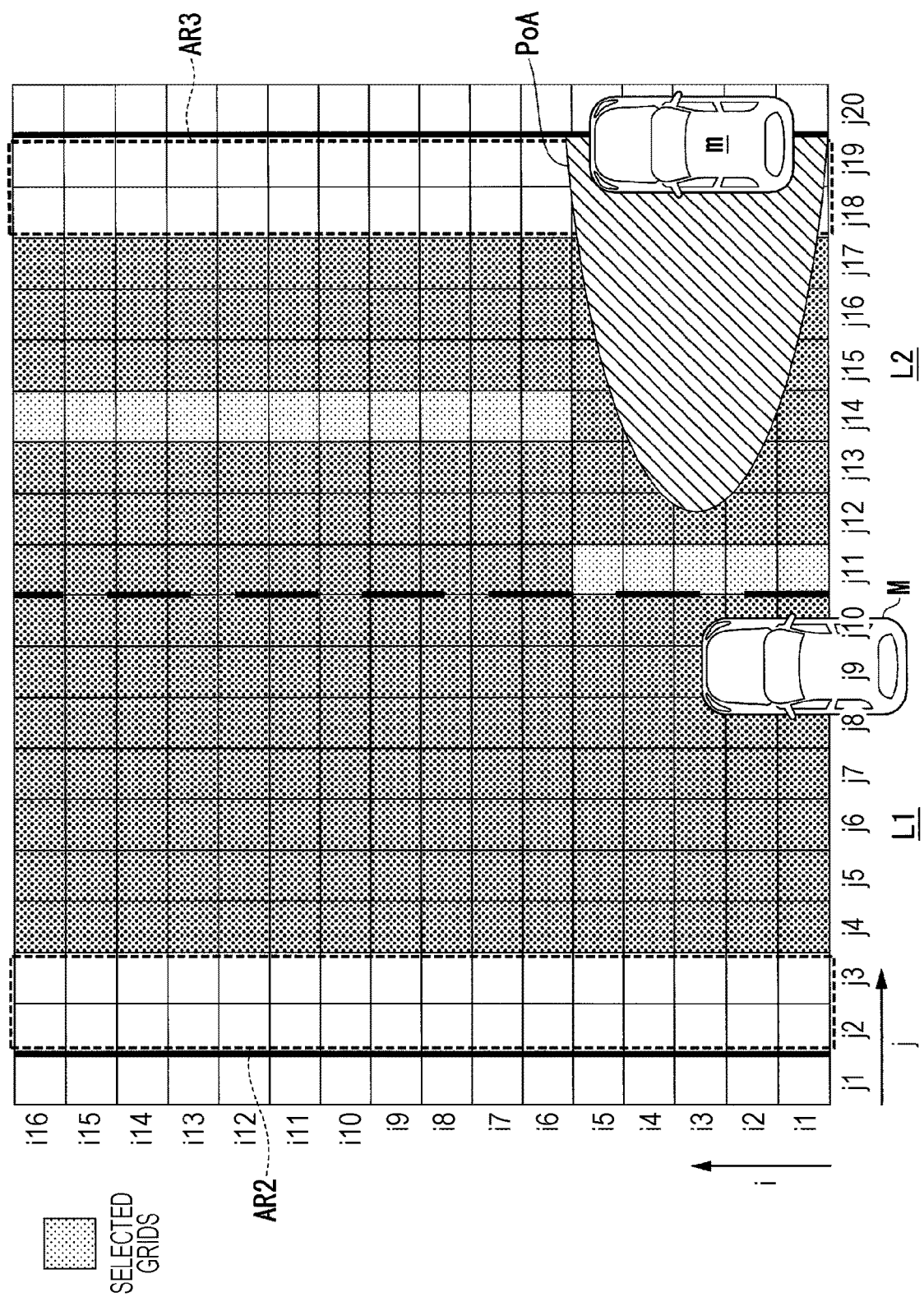
FIG. 20 illustrates an exemplary scene in which another vehicle is approaching the host vehicle while the host vehicle is making a lane change.

FIG. 20 illustrates an exemplary scene in which the other vehicle m is approaching the host vehicle M while the host vehicle M is making a lane change. In this case, although the minimum value of the induced potential Pi is set at the center of the lane L2 to which the host vehicle M is to make a lane change, the selected grids G are on the left side of the lane L2 to which the host vehicle M is to make a lane change due to the effect of the object potential Po that occurs from approach of the other vehicle m to the host vehicle M. Accordingly, the selected grids G are set at positions apart from the other vehicle m when the other vehicle m is approaching the host vehicle M even during the lane change.

Figure 21:
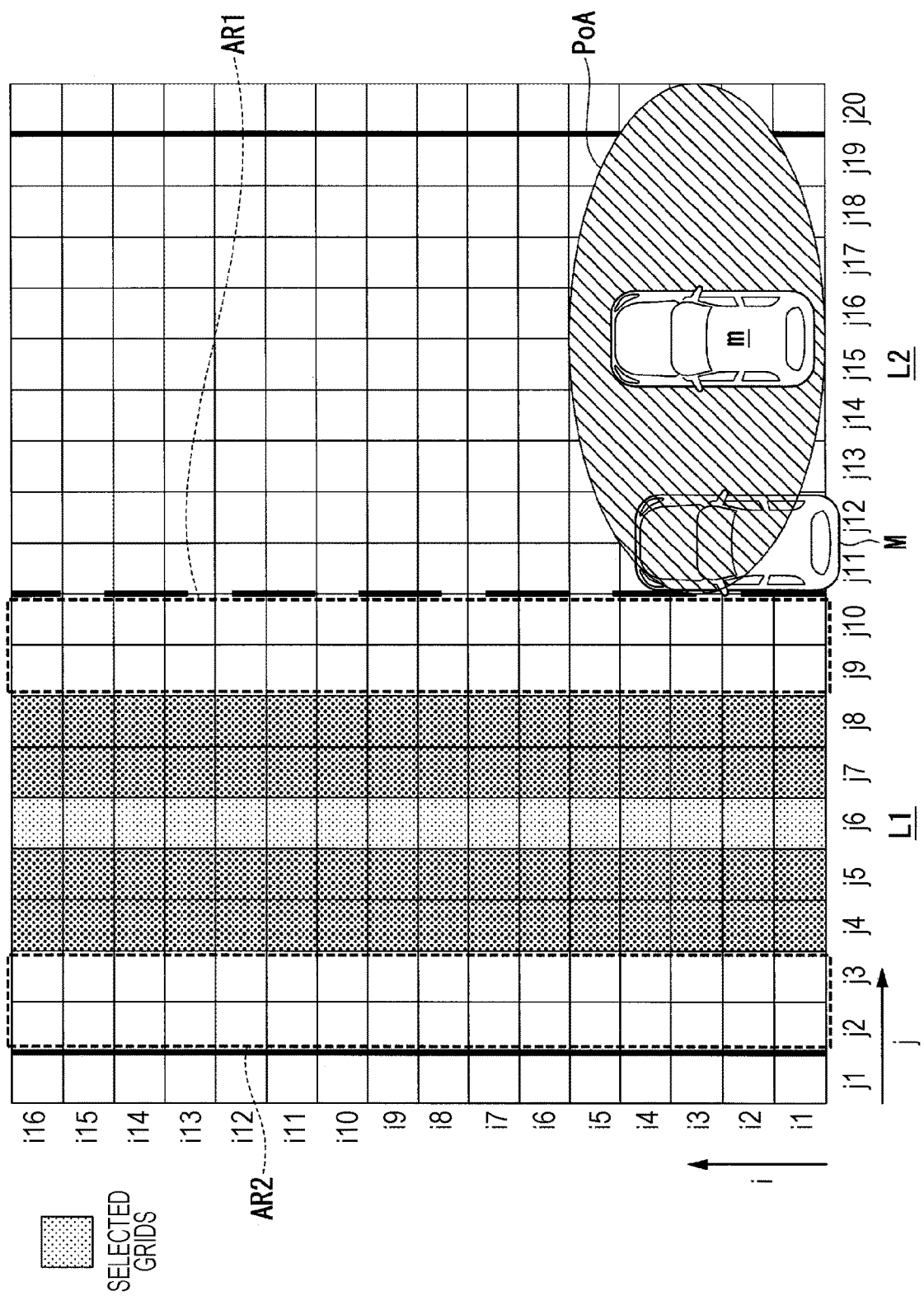
FIG. 21 illustrates an exemplary scene in which the lane change mode is interrupted.

FIG. 21 illustrates an exemplary scene in which the lane change mode is interrupted. When the other vehicle m is approaching the host vehicle M within a predetermined distance, the action plan creator 123 interrupts the lane change mode so that the vehicle M does not approach the object potential area PoA. In this case, the action plan creator 123 sets the minimum value of the induced potential Pi at the center of the lane L1 before the lane change. This enables the host vehicle M to immediately return to the lane before the lane change.

According to the second embodiment described above, since the lateral positions appropriate for the surrounding environment of the host vehicle M are determined in the scene in which the lane change is prepared or the scene in which the lane change is performed, effects and advantages similar to those of the first embodiment are achieved.

In the process described above, for example, if the integrated index value having the lowest object potential Po, among the integrated index values, appears outside an area the object potential Po of which is higher than or equal to a predetermined value (at the side of the other vehicle, which is apart from the host vehicle M), the lowest integrated index value, among the integrated index values appearing inside the object potential Po (at the side of the other vehicle, which is close to the host vehicle M), may be selected.

FIG. 22 illustrates an exemplary scene in which the integrated index value is selected. Referring to FIG. 22, the vertical axis represents the potentials and the horizontal axis represents the positions of the lanes L1 and L2. A right side diagram in FIG. 22 illustrates the induced potential Pi and the object potential Po in an area AR6 in a left side diagram in FIG. 22. In the right side diagram in FIG. 22, PR denotes the road traffic line on the right side of the lane L2. As illustrated in the right side diagram in FIG. 22, the grids G having the lowest integrated index value may appear outside (an area A side) of an area in which the object potential Po is higher than or equal to a predetermined value TH. In this case, when the host vehicle M moves to the position having the lowest integrated index value, it is necessary for the host vehicle M to pass through the area the object potential Po of which is higher than or equal to the predetermined value TH. Since the host vehicle M approaches the object, it is not appropriate to move to the grids G having the lowest integrated index value. Accordingly, the selector 137 may select the grids G corresponding to the lowest integrated index value, among the integrated index values at the inner side (an area B side) of the object potential Po, as the selected grids G.

<Hardware Configuration>

Figure 23:
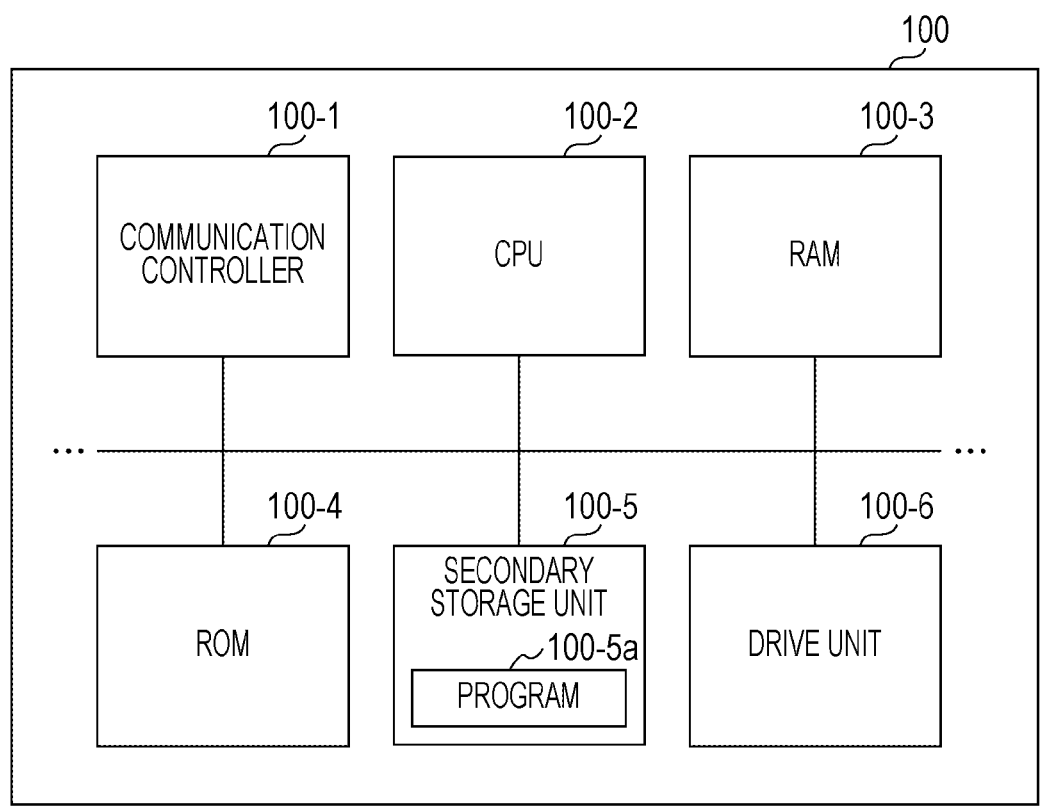
FIG. 23 is a block diagram illustrating an exemplary hardware configuration of the automated driving control unit according to an embodiment.

The automated driving control unit 100 in the embodiments described above is realized by, for example, a hardware configuration illustrated in FIG. 23. FIG. 23 is a block diagram illustrating an example of the hardware configuration of the automated driving control unit 100 according to an embodiment.

Referring to FIG. 23, the automated driving control unit 100 has a configuration in which a communication controller 100-1, a CPU 100-2, a RAM 100-3, a ROM 100-4, a secondary storage unit 100-5, such as a flash memory or an HDD, and a drive unit 100-6 are connected to each other via an internal bus or a private communication line. A portable storage medium, such as an optical disc, is loaded in the drive unit 100-6. A program 100-5a stored in the secondary storage unit 100-5 is decomposed by a direct memory access (DMA) controller (not illustrated) into the RAM 100-3 and is executed by the CPU 100-1 to realize the first control portion 120 and the second control portion 140. The program to which the CPU 100-2 refers may be stored in the portable storage medium (a computer readable medium) loaded in the drive unit 100-6 or may be downloaded from another apparatus via a network.

The above embodiment is capable of being realized in the following manner.

A storage unit and a hardware processor are provided. A program is stored in the storage unit. The program causes the hardware processor to detect an surrounding object around a vehicle, to set a first potential for multiple divided areas resulting from division of a road area on which the vehicle is driving based on the road area, to set a second potential for the divided areas based on the detected surrounding object, to calculate an index value by evaluating a potential of a target divided area based on the first potential and the second potential set for the target divided area in the multiple divided areas and foreseen information generated for surrounding divided areas selected from a periphery of the target divided area, and to select one or more divided areas along a moving direction of the vehicle from the multiple divided areas based on the calculated index value.

Although the aspects of the present disclosure have been described using the embodiments, the present disclosure is not limited to the embodiments and many modifications and changes may be made without departing from the true spirit and scope of the present disclosure.

What is claimed is:

1. A vehicle control apparatus comprising:
a detecting unit configured to detect an surrounding object in a road area surrounding the vehicle in which the vehicle is driving, the road area being divided into a plurality of divided areas;
a first setting unit configured to set a first potential for the plurality of divided areas based on the road area;
a second setting unit configured to set a second potential for the divided areas based on the surrounding object detected by the detecting unit;
an evaluating unit configured to
 select one divided area of the divided areas,
 select other divided areas which surround the one divided area,
 obtain the first potential and the second potential set for the one divided area,
 obtain foreseen information generated for the other divided areas, and
 calculate an index value which represents a total potential of the one divided area, based on (i) the first potential and the second potential set for the one divided area and (ii) the foreseen information generated for the other divided areas; and
a selecting unit configured to select one or more divided areas along a moving direction of the vehicle from the plurality of divided areas, based on the index value calculated for the one divided area by the evaluating unit.

2. The vehicle control apparatus according to claim 1, wherein the foreseen information is generated based on the first potential and the second potential set for the other divided areas.

3. The vehicle control apparatus according to claim 1, wherein the other divided areas are selected so as to include the divided areas extending from a front side of the one divided area in the moving direction of the vehicle.

4. The vehicle control apparatus according to claim 1, wherein the other divided areas comprise the divided areas selected along the moving direction of the vehicle and selected along a width direction of the vehicle, and wherein a number of the other divided areas selected along the moving direction of the vehicle is greater than a number of the other divided areas selected along the width direction of the vehicle.

5. The vehicle control apparatus according to claim 1, wherein the evaluating unit determines and selects the other divided areas extending in the moving direction of the vehicle based on a driving state of the vehicle.

6. The vehicle control apparatus according to claim 1, wherein the selecting unit selects the one or more divided areas from the divided areas extending in a width direction based on the index values calculated for the respective divided areas extending in the width direction while shifting the area to be evaluated in the moving direction of the vehicle.

7. The vehicle control apparatus according to claim 1, wherein when the divided area selected by the selecting unit is inside a lane on which the vehicle is driving and the index value of the corresponding one divided area is higher than or equal to a predetermined value, the evaluating unit further calculates the index value of another divided area outside the lane on which the vehicle is driving.

8. The vehicle control apparatus according to claim 1, further comprising:
a route generating unit that generates a route on which the vehicle will drive using the one or more divided areas selected by the selecting unit.

9. A vehicle control method performed by a computer, the method comprising:
detecting an surrounding object in a road area surrounding the vehicle in which the vehicle is driving, the road area being divided into a plurality of divided areas;
setting a first potential for the plurality of divided areas based on the road area;
setting a second potential for the divided areas based on the detected surrounding object;
selecting one divided area of the divided areas;
selecting other divided areas which surround the one divided area;
obtaining the first potential and the second potential set for the one divided area;
obtaining foreseen information generated for the other divided areas;
calculating an index value which represents a total potential of the one divided area based on (i) the first potential and the second potential set for the one divided area and (ii) the foreseen information generated for the other divided areas; and
selecting one or more divided areas along a moving direction of the vehicle from the plurality of divided areas based on the index value calculated for the one divided area.

10. A computer readable medium containing a program having instructions stored in the medium to perform:
detecting an surrounding object in a road area surrounding the vehicle in which the vehicle is driving, the road area being divided into a plurality of divided areas;
setting a first potential for the plurality of divided areas based on the road area;
setting a second potential for the divided areas based on the detected surrounding object;
selecting one divided area of the divided areas;
selecting other divided areas which surround the one divided area;
obtaining the first potential and the second potential set for the one divided area;
obtaining foreseen information generated for the other divided areas;
calculating an index value which represents a total potential of the one divided area based on (i) the first potential and the second potential set for the one divided area and (ii) the foreseen information generated for the other divided areas; and selecting one or more divided areas along a moving direction of the vehicle from the plurality of divided areas based on the index value calculated for the one divided area.

* * * * *